United States Patent [19]

Iijima et al.

[11] Patent Number: 5,708,307
[45] Date of Patent: Jan. 13, 1998

[54] ANTI-THEFT CAR PROTECTION SYSTEM

[75] Inventors: Yohichi Iijima, Hadano; Yoshiki Onuma, Ebina; Takashi Yoshizawa, Atsugi, all of Japan

[73] Assignee: Nissan Motor Co., Ltd., Kanagawa, Japan

[21] Appl. No.: 546,800

[22] Filed: Oct. 23, 1995

[30] Foreign Application Priority Data

| | | | |
|---|---|---|---|
| Nov. 2, 1994 | [JP] | Japan | 6-269394 |
| Dec. 7, 1994 | [JP] | Japan | 6-303518 |
| Dec. 7, 1994 | [JP] | Japan | 6-303519 |
| Dec. 9, 1994 | [JP] | Japan | 6-306290 |

[51] Int. Cl.$^6$ .................................. B60R 25/10
[52] U.S. Cl. .................. 307/10.5; 307/10.3; 307/10.4; 307/10.5; 307/10.2; 180/287; 340/426
[58] Field of Search ................. 307/9.1–10.8; 364/424.01–424.05; 180/287, 167; 361/171, 172; 340/825.31, 825.34, 825.69, 825.72, 825.32, 426, 425.5; 123/198 B, 198 DB, 198 DC

[56] References Cited

U.S. PATENT DOCUMENTS

| | | | |
|---|---|---|---|
| 4,236,594 | 12/1980 | Ramsperger | 180/167 |
| 4,965,460 | 10/1990 | Tanaka et al. | 307/10.4 |
| 5,519,260 | 5/1996 | Washington | 307/10.5 |
| 5,519,376 | 5/1996 | Iijima | 307/10.3 |
| 5,528,086 | 6/1996 | Maass | 307/10.5 |
| 5,539,260 | 7/1996 | Khangura | 307/10.3 |
| 5,554,891 | 9/1996 | Shimizu | 307/10.3 |
| 5,583,383 | 12/1996 | Denz | 307/10.5 |

FOREIGN PATENT DOCUMENTS

| | | |
|---|---|---|
| 44 12 214 | 10/1994 | Germany . |
| 44 22 296 | 11/1994 | Germany . |
| 61-122379 | 6/1986 | Japan . |
| 64-56248 | 3/1989 | Japan . |
| 64-56253 | 3/1989 | Japan . |
| 2 269 253 | 2/1994 | United Kingdom . |
| 2 285 160 | 6/1995 | United Kingdom . |
| 2289357 | 11/1995 | United Kingdom ......... 307/10.5 |

OTHER PUBLICATIONS

The Present State and Trends of the Vehicle Burglar–Proof Systems—Car and Technology, vol. 48, Nov. 8, 1994, pp. 56–64.

Primary Examiner—William M. Shoop, Jr.
Assistant Examiner—Peter Ganjian
Attorney, Agent, or Firm—Lowe, Price, LeBlanc & Becker

[57] ABSTRACT

An anti-theft car protection system comprises a transmitter-receiver for receiving a code of the key, an immobilizer unit for collating said code as received with a code as registered and transmitting an engine start permission signal to an engine control unit when said code as received coincides with said code as registered, and means, cooperating with said immobilizer unit, for removing repetition of key operation upon start of the engine.

50 Claims, 20 Drawing Sheets

ANTI-THEFT CAR PROTECTION SYSTEM

BACKGROUND OF THE INVENTION

The present invention relates generally to an anti-theft car protection system and more particularly, to the anti-theft car protection system which adopts collation of an ID number of an ignition key.

Various types of anti-theft car protection systems have been proposed in past years to prevent unfair unlocking of a key of a motor vehicle, etc. One is constructed such that an ID number of the key is transmitted when inserting the key into a key cylinder, and start of an engine is permitted only when the ID number coincides with a previously registered one.

A problem encountered in the above conventional anti-theft car protection system is such that if the engine is stopped for some reason after start with coincidence of the ID number, key collation is carried out again, taking time for restart of the engine.

In view of such problem, JP-A 64-56248 proposes a system which, when the engine is stopped for some reason after start, key collation is not carried out upon restart of the engine. More concretely, the system is provided with a holding circuit for continuously holding an engine control unit for controlling start of the engine in a turn-on state, which is in operation once the engine is started, permitting start of the engine without key collation.

In JP-A 64-56248, the holding circuit comprises a transistor, a relay, and a diode, which are connected to a CPU for controlling the entirety of the system and a main relay. Moreover, the holding circuit includes a battery, a key switch to be turned on when the key is operated to an ignition turn-on position, and an engine control unit.

In this holding circuit, with coincidence of the ID number of the key, the CPU outputs a high-level signal to turn on the transistor. In that state, if the key is operated to an ignition turn-on position, the key switch is turned on to pass a current through a coil of the relay, which is also turned on. With the relay turned on, a current passes through a coil of the main relay, which is also turned on, so that the engine control unit is turned on to start the engine.

In that state, even if the CPU outputs a low-level signal, the relay is maintained in a turn-on state due to the diode connected, and therefore, the main relay is also maintained in a turn-on state. That is, once the transistor is turned on, the engine control unit switches operation in accordance with turn-on/turn-off of the key switch regardless of a collation result of the key.

In such a way, the system of JP-A 64-56248 is provided with the holding circuit by which key collation can be avoided upon restart of the engine.

The holding circuit of JP-A 64-56248 serves to hold the relay in a turn-on state even if the CPU breaks down with the key operated to an ignition turn-on position. However, once the key is operated to an ignition turn-off position, holding of the relay by the holding circuit is released. Therefore, if the CPU malfunctions after ignition turn-off to output no signal to the holding circuit, start of the engine is not possible. That is, with the system of JP-A 64-56248, if the CPU malfunctions which carries out key collation, start of the engine is impossible even if the key is operated to an ignition turn-off position, then, to an ignition turn-on position again.

It is, therefore, an object of the present invention to provide an anti-theft car protection system which is free of the above drawback, and ensures start of the engine without repetition of key operation and inconvenience with respect to the system itself as long as the key as applied is a formal one.

SUMMARY OF THE INVENTION

According to one aspect of the present invention, there is provided an anti-theft car protection system for a motor vehicle having an engine, an engine control unit and a key, comprising:

means for receiving a code of the key transmitted therefrom;

means for collating said code as received with a code as registered, and transmitting an engine start permission signal to the engine control unit when said code as received coincides with said code as registered; and means, cooperating with said code collating means, for removing repetition of key operation upon start of the engine.

According to another aspect of the present invention, there is provided a method of protecting a motor vehicle from a theft, the motor vehicle having an engine, a key, an engine control unit and an immobilizer unit, the method comprising the steps of:

receiving a code of the key transmitted therefrom;

collating said code as received with a code as registered;

transmitting an engine start permission signal to the engine control unit when said code as received coincides with said code as registered; and removing repetition of key operation upon start of the engine.

BRIEF DESCRIPTION OF THE DRAWINGS

FIG. 4 is a flowchart showing operation of the immobilizer control unit upon ignition turn-on;

FIG. 5 is a view similar to FIG. 4, showing operation of the engine control unit upon ignition turn-on;

DETAILED DESCRIPTION OF THE INVENTION

Figure 1:
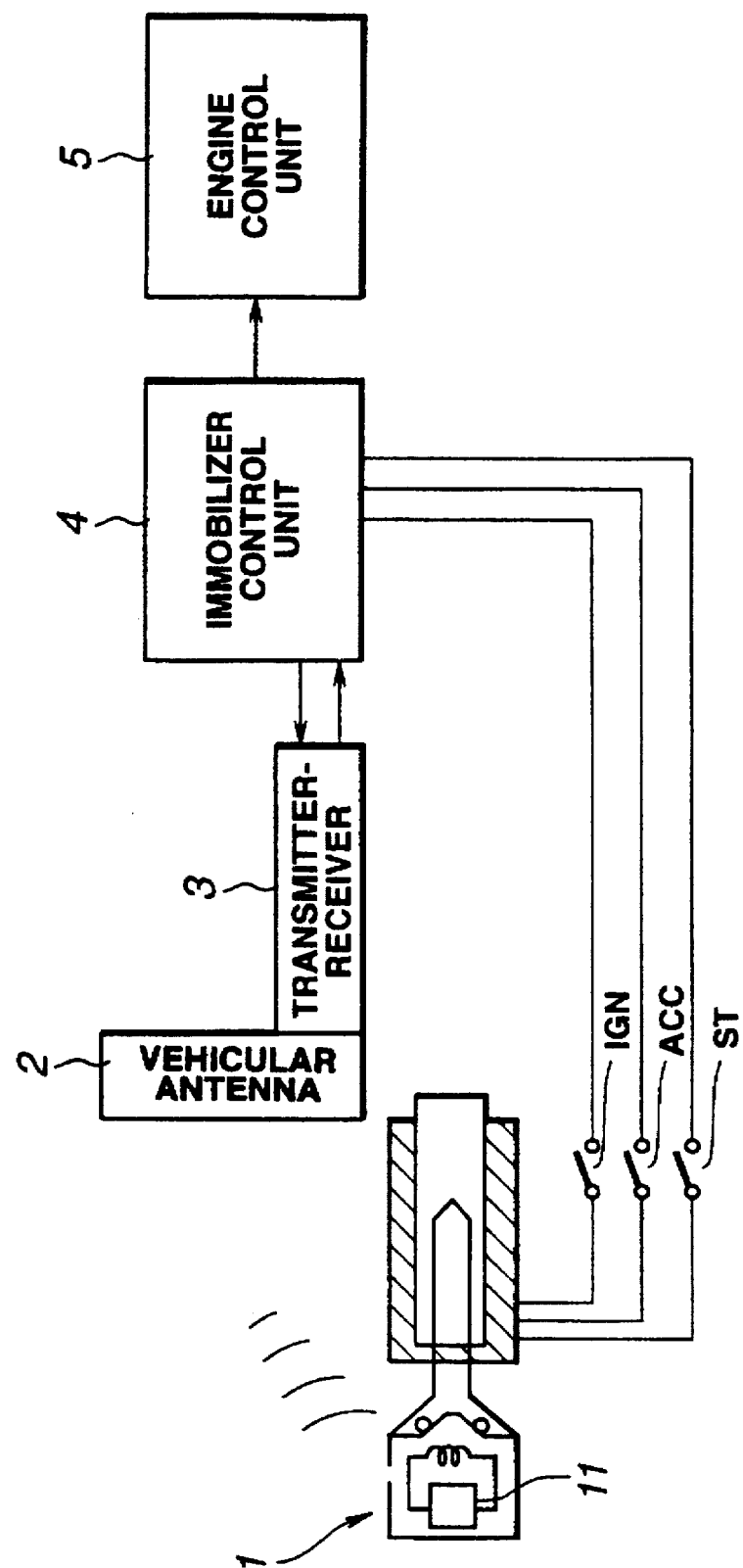
FIG. 1 is a block diagram showing a first preferred embodiment of an anti-theft car protection system according to the present invention.
Figure 2:
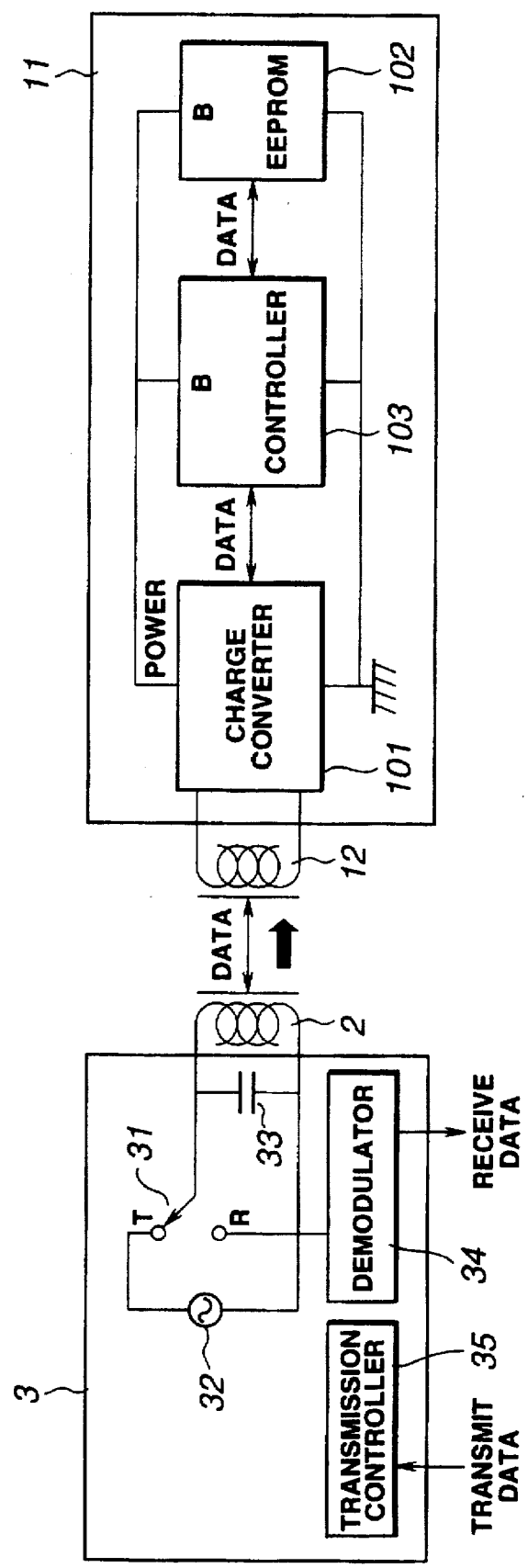
FIG. 2A is a view similar to FIG. 1, showing a transmitter-receiver arranged in a motor vehicle.
FIG. 2B is a view similar to FIG. 2A, showing a transponder built in a key.

Referring to the drawings, preferred embodiments of an anti-theft car protection system will be described.

FIGS. 1–7 show a first embodiment of the present invention. Referring to FIG. 1, an anti-theft car protection system comprises a key 1 having a transponder 11 built therein for ensuring transmission/receiving with respect to a vehicular antenna 2. Referring to FIG. 2B, the transponder 11 comprises a charge converter 101 for accumulating in a capacitor, not shown, radio waves derived from the vehicular antenna 2 and received by a key antenna 12 in the form of an electric charge, an EEPROM 102 for storing the ID number of the key 1, and a controller 103 for controlling read-out of the ID number, transmission/receiving of radio waves with respect to a motor vehicle, etc.

Referring again to FIG. 1, a transmitter-receiver 3 is provided for ensuring transmission/receiving with respect to the key 1. Referring to FIG. 2A, the transmitter-receiver 3 comprises a transmission/receiving switch 31 for switching transmission/receiving of radio waves, a capacitor 33 for accumulating received radio waves in the form of an electric charge, a demodulator 34 for demodulating received waves, and a transmission controller 35 for controlling a timing of transmit of radio waves, etc.

Referring again to FIG. 1, an immobilizer control unit 4 is provided for detecting whether or not the ID number of the key 1 coincides with a previously registered code. The immobilizer control unit 4 carries out key collation when the key 1 is operated to an ignition turn-on position, and transmits, when the ID number coincides with the code, an engine start permission signal to an engine control unit 5. The engine control unit 5 starts an engine, not shown, when receiving the engine start permission signal from the immobilizer control unit 4.

Figure 3:
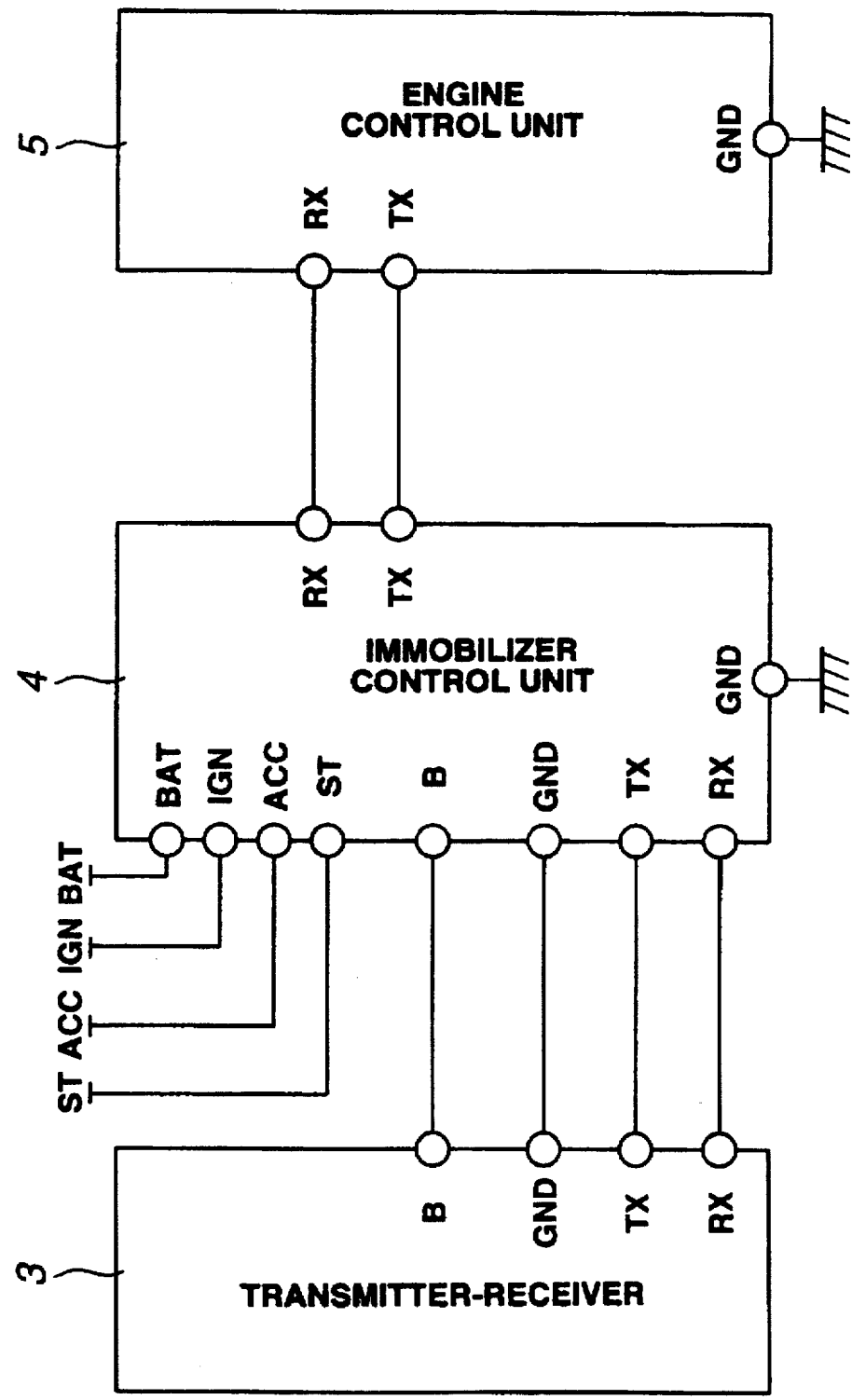
FIG. 3 is a view similar to FIG. 2B, showing connection between input and output terminals of the transmitter-receiver, an immobilizer control unit, and an engine control unit.

FIG. 3 is a block diagram showing connection between input and output terminals of the transmitter-receiver 3, the immobilizer control unit 4, and the engine control unit 5 as shown in FIG. 1. Referring to FIG. 3, the transmitter-receiver 3 and the immobilizer control unit 4 are interconnected by a power source terminal B, a ground terminal GND, a terminal TX of transmit data to the key 1, and a terminal RX of receive data from the key 1. The immobilizer control unit 4 and the engine control unit 5 are interconnected by a terminal TX of a start signal from the immobilizer control unit 4 and a terminal RX of an engine start state signal from the engine control unit 5. The immobilizer control unit 4 is provided with a terminal BAT of a source voltage from a battery, not shown, a terminal ACC of an ACC switch to be turned on when the key 1 is operated to an accessory position, a terminal IGN of an IGN switch to be turned on when the key 1 is operated to an ignition turn-on position, and a terminal ST of a ST switch to be turned on when the key 1 is operated to a start position.

Referring to FIGS. 1–7, operation of the first embodiment will be described.

Figure 4:
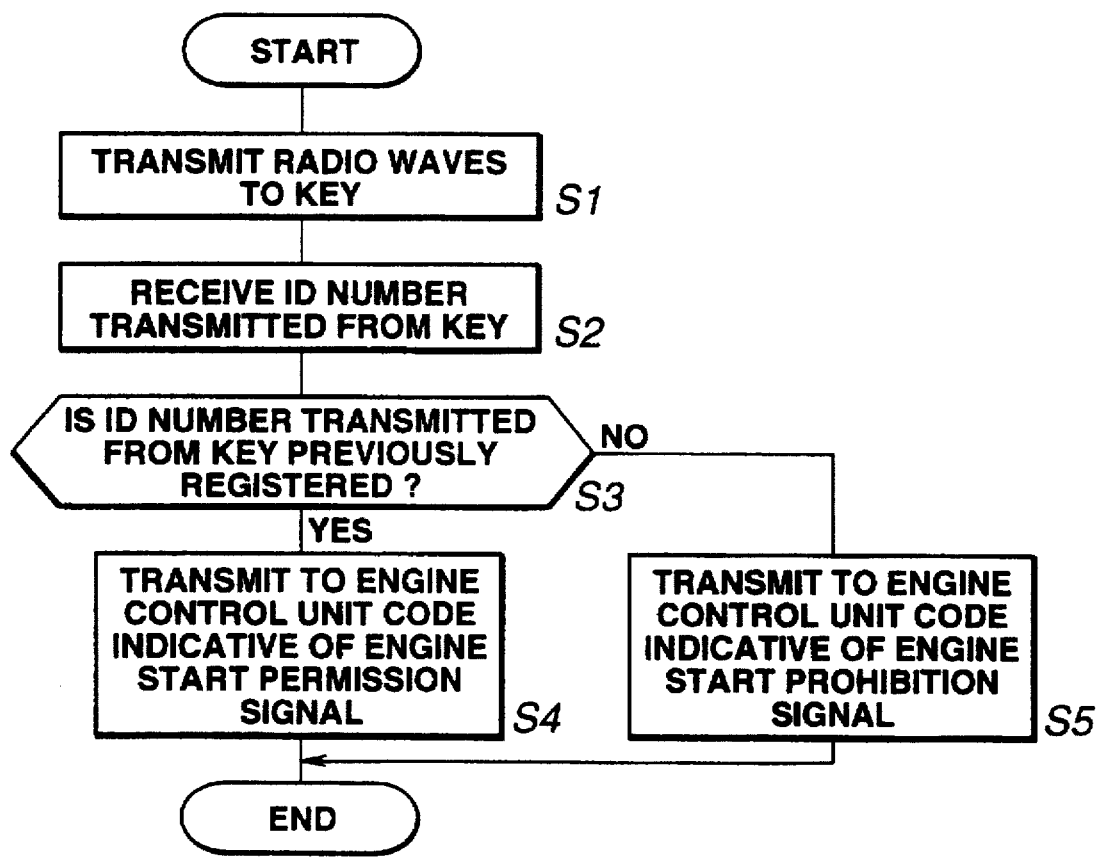

FIG. 4 is a flowchart showing operation of the immobilizer control unit 4 when the key 1 is operated to an ignition turn-on position.

Referring to FIG. 4, at a step S1, the vehicular antenna 2 transmits radio waves of, e.g. 120 kHz to the key 1. The radio waves are received by the key antenna 12, and input to the charge converter 101 of the transponder 11 for rectification, which are then accumulated in the capacitor in the form on an electric charge. The charge converter 101 converts an accumulated charge into a voltage which is supplied to power source terminals B of the EEPRM 102 and the controller 103. The controller 103 transmits an ID number read out of the EEPROM 102 to the charge converter 101 which in turn transmits the ID number to the vehicular antenna 2.

At a step S2, the ID number transmitted from the key 1 is received. That is, the ID number is read which is received by the vehicular antenna 2, and demodulated by the demodulator 84 of the transmitter-receiver 3.

At a step 3, it is determined whether or not the ID number transmitted from the key 1 corresponds to a previously registered one. If determination is affirmative, control proceeds to a step S4 where a code indicative of an engine start permission signal is transmitted to the engine control unit 5. The code indicative of an engine start permission signal is transmitted from the engine control unit 5 to the immobilizer control unit 4 as will be described later.

On the other hand, at the step S3, if determination is negative, control proceeds to a step S5 where a code indicative of an engine start prohibition signal is transmitted to the engine control unit 5. The code indicative of an engine start prohibition signal is also transmitted from the engine control unit 5 to the immobilizer control unit 4.

Figure 5:
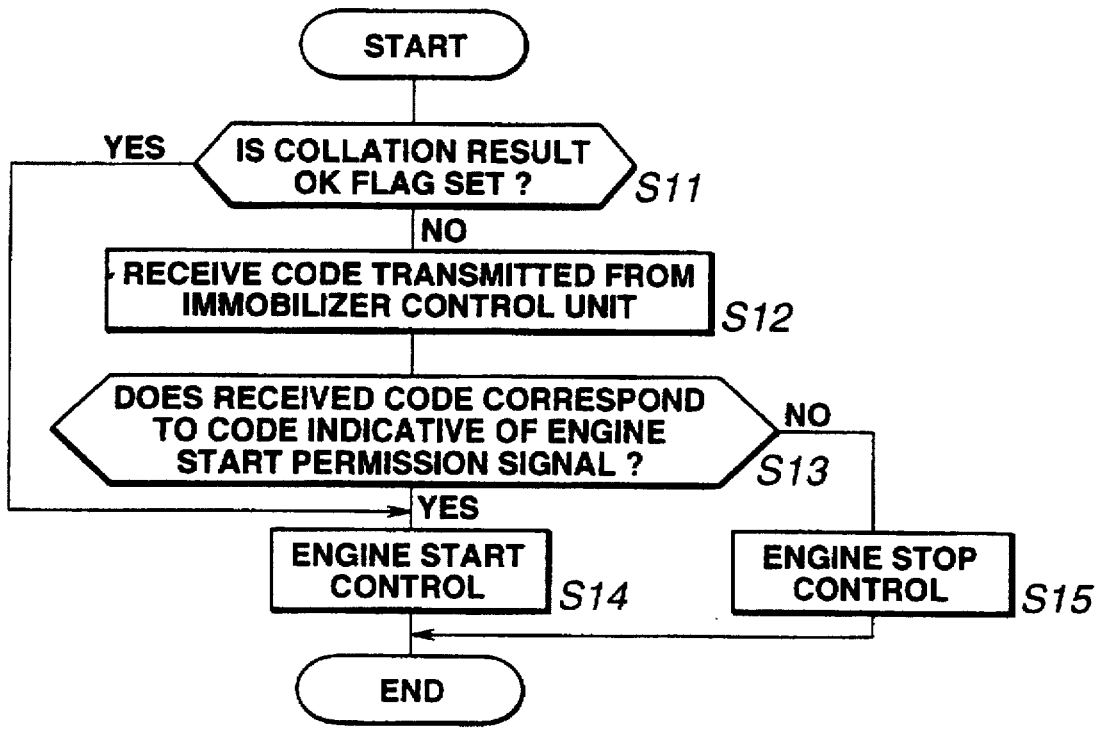

FIG. 5 is a flowchart showing operation of the engine control unit 5 when the key 1 is operated to an ignition turn-on position. Referring to FIG. 5, at a step S11, it is determined whether or not a collation result OK flag is set. The collation result OK flag is a flag indicative that the code transmitted from the immobilizer control unit 4 coincides with the code indicative of an engine start permission signal, and set when the former code coincides with the latter code. A value of the collation result OK flag is stored in an EEPROM, not shown, of the engine control unit 5.

At the step S11, if determination is negative, control proceeds to a step S12 where the code transmitted from the immobilizer control unit 4 is received. At a subsequent step S13, it is determined whether or not the received code corresponds to the code indicative of an engine start permission signal. If determination is affirmative, control proceeds to a step S14 where engine start control is carried out, then, it comes to an end.

On the other hand, at the step S13, if determination is negative, control proceeds to a step S15 where engine stop control is carried out, then, it comes to an end.

At the step S11, if determination is affirmative, control proceeds to the step S14. That is, when the collation result OK flag is already set, an engine is started regardless of a code collation result.

The above operation of the immobilizer control unit 4 and the engine control unit 5 upon ignition turn-on will be described in brief. The immobilizer control unit 4 collates the ID number transmitted from the key 1 with the previously registered number. If the former number coincides with the latter number, the immobilizer control unit 4 transmits the code indicative of an engine start permission signal to the engine control unit 5. The engine control unit 5 determines whether or not the code indicative of an engine start permission signal is received. If determination is affirmative, the collation result OK flag to be stored in the EEPROM is set. On the other hand, when the collation result OK signal is already set upon ignition turn-on, the engine control unit 5 permits engine start without detecting the code from the immobilizer control unit 4.

In such a way, if the collation result OK flag is set, engine start is permitted regardless of a key collation result. In case that the immobilizer control unit 4 or the engine control unit 5 malfunctions after the key collation result is affirmative, the engine is started in accordance with a result of conventional mechanical key collation such as comparison of a key shape, etc. regardless of a result of electrical key collation ensured by the immobilizer control unit 4.

Figure 6:
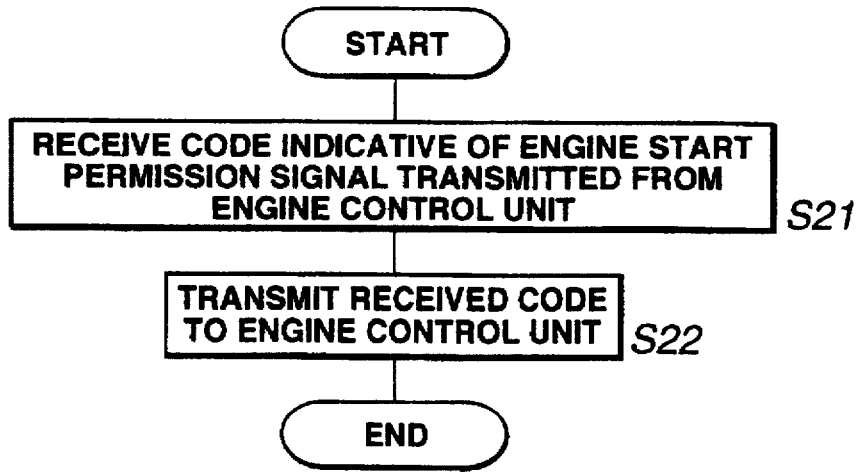
FIG. 6 is a view similar to FIG. 5, showing operation of the immobilizer control unit upon ignition turn-off.

FIG. 6 is a flowchart showing operation of the immobilizer control unit 4 when the key 1 is operated to an ignition turn-off position.

Referring to FIG. 6, at a step S21, the code is received which is indicative of an engine start permission signal transmitted from the engine control unit 5. The received code is used upon subsequent ignition turn-on. That is, when transmitting an engine start permission signal to the engine control unit 5, the code received at the step S21 is transmitted to the engine control unit 5. At a subsequent step S22, the code received at the step S21 is returned to the engine control unit 5, and control comes to and end.

The reason why the code received once is returned to the engine control unit 5 in such a way is to determine through transmission/receiving of the code whether or not communication between the immobilizer control unit 4 and the engine control unit 5 is carried out correctly.

Figure 7:
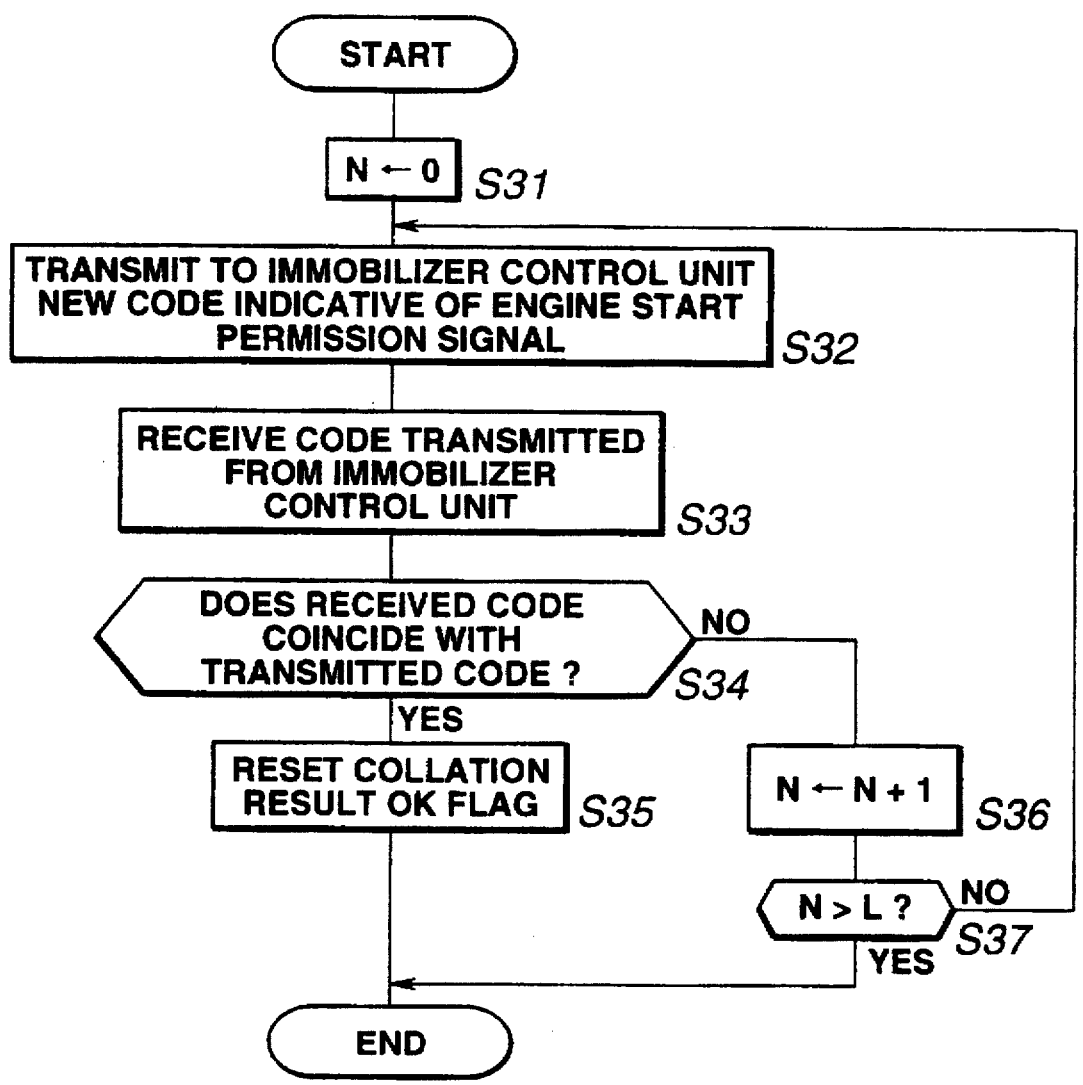
FIG. 7 is a view similar to FIG. 6, showing operation of the engine control unit upon ignition turn-off.

FIG. 7 is a flowchart showing operation of the engine control unit 5 when the key 1 is operated to an ignition turn-off position.

Referring to FIG. 7, at a step S31, a variable N is initialized to 0. The variable N serves to measure the number of times of execution of control at a step S33 as will be described later. At a subsequent step S32, a new code indicative of an engine start permission signal is transmitted to the immobilizer control unit 4. The reason why the new code indicative of an engine start permission signal is transmitted every ignition turn-off is to increase an anti-theft performance by changeability of the code indicative of an engine start permission signal.

At the step S33, the code is received which is transmitted from the immobilizer control unit 4. At a subsequent step S34, it is determined whether or not the received code coincides with the code transmitted at the step S32. If determination is affirmative, control proceeds to a step S35 where the collation result OK flag stored in the EEPROM of the engine control unit 5 is reset, and it comes to an end.

At the step S34, if determination is negative, control proceeds to a step S36 where 1 is added to the variable N. At a subsequent step S37, it is determined whether or not the variable N is greater than a predetermined threshold value L. If determination is negative, control returns to the step S32, whereas if determination is affirmative, control comes to an end.

The above operation of the immobilizer control unit 4 and the engine control unit 5 upon ignition turn-off will be described in brief. The engine control unit 5 transmits the new code indicative of an engine start permission signal to the immobilizer control unit 4. When receiving the new code, the immobilizer control unit 4 returns it to the engine control unit 5. The engine control unit 5 determines whether or not the returned code coincides with the code transmitted to the immobilizer control unit 4. If determination is affirmative, the collation result OK flag is reset which is stored in the EEPROM of the engine control unit 5. On the other hand, if determination is negative, control of coincidence determination is repeatedly carried out L times. With all repetition, if the returned code does not coincide with the code transmitted to the immobilizer control unit 4, control comes to an end.

In such a way, the engine control unit 5 transmits every ignition turn-off the new code indicative of an engine start permission signal to the immobilizer control unit 4, resulting in a further improvement of an anti-theft performance. Further, when the engine control unit 5 transmits the code to the immobilizer control unit 4, the immobilizer control unit 4 returns the code to the engine control unit 5 to check whether or not the code is transmitted correctly. If the code is not transmitted correctly, it is determined that the immobilizer control unit 4 or the engine control unit 5 malfunctions. Thus, malfunction of the immobilizer control unit 4 or the engine control unit 5 can be detected quickly and easily.

Moreover, when the code is not transmitted correctly, the collation result OK flag stored in the EEPROM of the engine control unit 5 is maintained in a set state, so that upon subsequent ignition turn-on, the engine can be started in accordance with a result of mechanical key collation without carrying out electrical key collation in the immobilizer control unit 5.

Thus, even if impossible normal communication or so-called system anomaly occurs in any of the key 1, vehicular antenna 2, transmitter-receiver 3, immobilizer control unit 4, and engine control unit 5 after key collation is OK, the engine can be started. It is noted that "impossible normal communication" corresponds to impossible normal transmission of the ID number of the key 1, the code indicative of an engine start permission signal and the collation result OK flag, impossible normal execution of read and write of a memory such as EEPROM, etc.

On the other hand, when the code is transmitted correctly, the collation result OK flag is reset, then, key collation is carried out again upon ignition turn-on, fulfilling the function of the anti-theft car protection system.

At the steps S33, S34 as shown in FIG. 7, it is determined that malfunction of the immobilizer control unit 4 or the engine control unit 5 occurs when the code which the engine control unit 5 transmits to the immobilizer control unit 4 does not coincide with the code which the latter unit 4 returns to the former unit 5. However, control as shown in FIG. 7 is not limitative as means for detecting whether or not the immobilizer control unit 4 or the engine control unit 5 malfunctions.

Moreover, the condition of resetting the collation result OK flag is not limited to when determination at the step S88 as shown in FIG. 7 is affirmative. By way of example, the collation result OK flag may be reset when an external diagnostic device provides an initializing signal after replacement or repair of a failed portion.

Figure 8:
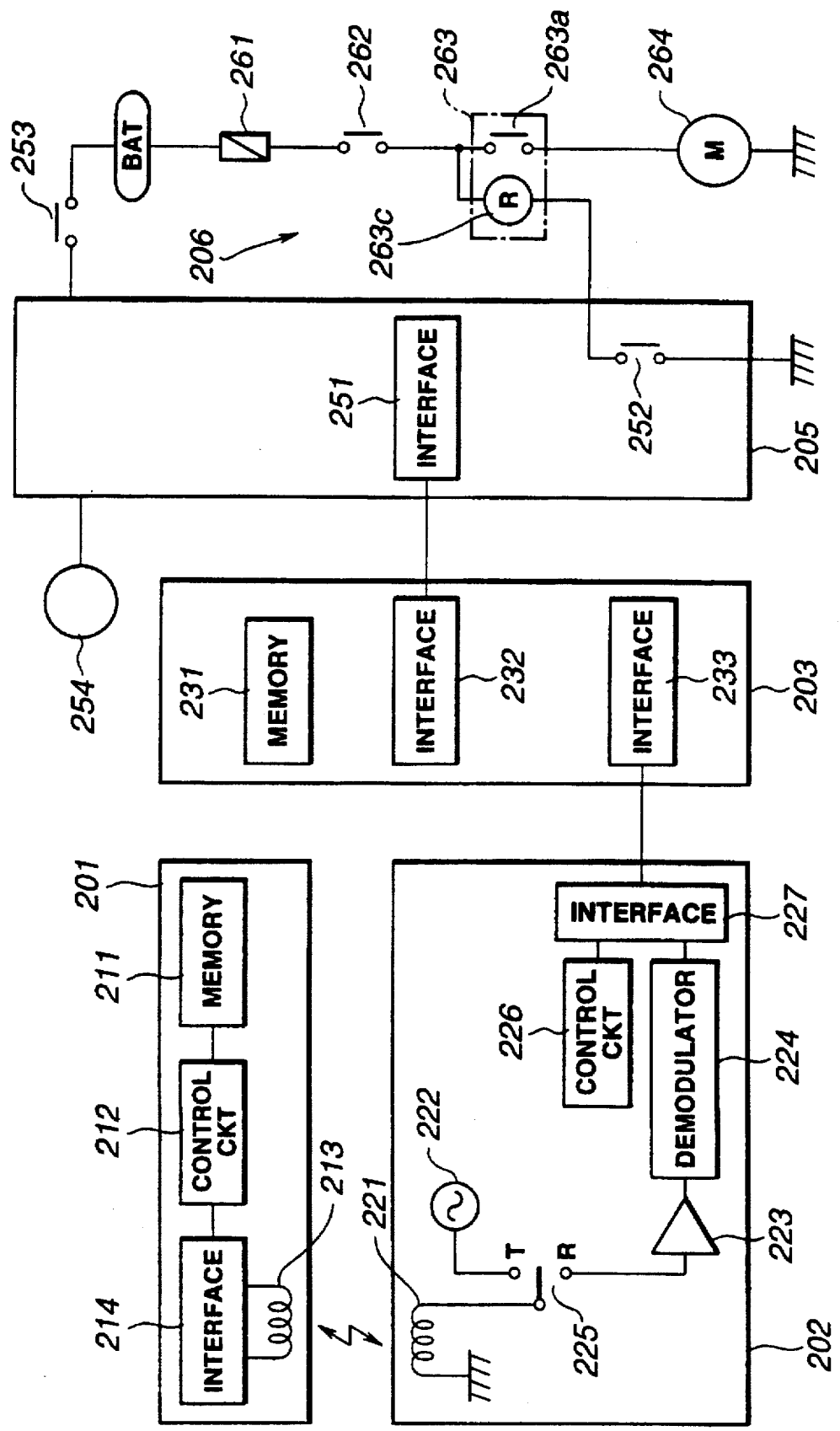
FIG. 8 is a view similar to FIG. 3, showing a second preferred embodiment of the present invention.

FIGS. 8–11 show a second embodiment of the present invention. Referring to FIG. 8, the anti-theft car protection system comprises a transponder 201, an antenna unit 202, an immobilizer unit 203, and an engine control unit 205.

Figure 9:
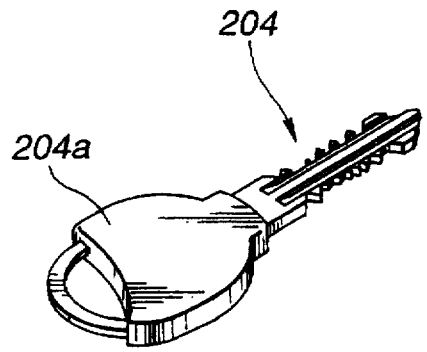
FIG. 9 is a perspective view illustrating a key.

Referring also to FIG. 9, the transponder 201 is embedded in a head portion 204a of a key 204, and is provided with a nonvolatile memory 211 such as EEPROM in which an ID number of the key 204 is previously stored, a control circuit 212 for controlling communication with the antenna unit 202, and an interface 214 for ensuring communication with the antenna unit 202 through an antenna 213. The interface 214 includes a capacitor, and serves to receive and rectify pulse-signal waves of a predetermined frequency, which is accumulated in the capacitor so as to serve as a power upon ID number transmission. When receiving pulse-signal waves of a predetermined frequency from the antenna unit 202, the control circuit 212 reads the ID number out of the memory 211 by using a power of pulse-signal waves, which is transmitted to the antenna unit 202 of the motor vehicle through the interface 214.

The antenna unit 202 is arranged in an ignition key cylinder, not shown, of the motor vehicle, and is provided with an oscillator 222 for generating a pulse signal of a predetermined frequency to be transmitted to the transponder 201, an amplifier 223 for amplifying a signal received from the transponder 201, a demodulator 224 for demodulating the received signal to the ID number, a switch 225 for connecting the oscillator 222 to the antenna 221 upon signal transmission, and the amplifier 223 to the antenna 221 upon signal receiving, a control circuit 226 for controlling communication with the transponder 201 in accordance with a command out of the immobilizer unit 203, and an interface 227 for ensuring communication with the immobilizer unit 203. When receiving a power transmission command out of the immobilizer unit 223 through the interface 227, the control circuit 226 changes the switch 225 to a contact T so as to transmit to the transponder 201 through the antenna 221 a pulse signal of a predetermined frequency generated by the oscillator 222 during a predetermined period of time. This transmission time is determined to be sufficient for accumulating a transmission power in the interface 214 of the transponder 201. As soon as transmission is completed, the switch 225 is changed to a contact R so as to receive signal waves transmitted by the transponder 201, which are amplified by the amplifier 223, and demodulated to the ID number through the demodulator 224.

The immobilizer unit 203 comprises a microcomputer, not shown, and peripheral parts such as a nonvolatile memory 231, interfaces 232, 233, etc., and serves to ensure communication with the antenna unit 202 through the interface 233 in response to an ID collation request out of the engine control unit 205, and read the ID number of the key 204 through the antenna unit 202, which is collated with that one as previously registered in the memory 281. Moreover, the immobilizer unit 208 ensures communication with the engine control unit 205 through the interface 282 so as to transmit a collation result of the ID number in response to an ID collation request of the engine control unit 205.

The engine control unit 205 comprises a microcomputer, not shown, and peripheral parts such as an interface 251, a switch 252, etc., and serves to carry out start, stop and speed adjusting of an engine, not shown, and ensure communication with the immobilizer unit 203 through the interface 251 to request ID number collation and receive a result thereof. When receiving an ID noncoincidence signal from the immobilizer unit 203, the engine control unit 205 stops not only operation of a fuel supply system, not shown, for supplying fuel to the engine, but operation of an ignition controller, not shown, for carrying out ignition control of the engine, thus stopping the engine. Ordinarily, the engine control unit 205 closes the switch 252 to permit activation of a starter drive circuit 206 for starting the engine, whereas when it is determined that normal start operation of the engine is not carried out as will described later, the engine control unit 205 opens the switch 252 to prevent activation of the starter drive circuit 206, thus prohibiting start of the engine.

Connected to the engine control unit 205 are a switch 253 which is closed when the key 204 is set to an engine start position ST, and a speed detector 254 for detecting a cruising speed V of the motor vehicle.

Communication between the immobilizer unit 203 and the engine control unit 205 with regard to ID collation is ensured in accordance with the following procedure:

1) ID collation request

When detecting through the switch 253 that engine start operation is made by the key 204, the engine control unit 205 actuates a starter, fuel supply system, and ignition controller to start the engine, and transmits an ID collation request signal to the immobilizer unit 203.

2) ID coincidence/noncoincidence signal

When receiving an ID collation request signal from the engine control unit 205, the immobilizer unit 203 reads the ID number from the transponder 201 of the key 204 through the antenna unit 202, which is collated with that one as previously registered. In connection with a collation result, the immobilizer unit 203 transmits an ID coincidence signal or ID noncoincidence signal to the engine control unit 205.

When receiving an ID noncoincidence signal from the immobilizer unit 203, the engine control unit 205 stops immediately the fuel supply system and the ignition controller as described above, stopping the engine.

On the other hand, when receiving an ID coincidence signal, the engine control unit 205 confirms whether or not the immobilizer unit 203 itself is formal in accordance with the following procedure without immediately carrying out engine operation permission processing:

3) Rolling code transmission request

The engine control unit 205, which received an ID coincidence signal from the immobilizer unit 203, requests transmission of a rolling code from the immobilizer unit 203. This rolling code is set by the engine control unit 205 upon previous engine stop, and is transmitted to the immobilizer unit 203 for store in the memory 231.

4) Transmission of rolling code

The immobilizer unit 203, which received a rolling code transmission request from the engine control unit 205, transmits to the engine control unit 205 the rolling code received from the engine control unit 205 upon previous engine stop and stored in the memory 231.

The engine control unit 205, which received the rolling code from the immobilizer unit 203, collates the rolling code with that one transmitted to the immobilizer unit 203 upon previous engine stop. If the two coincide, the engine control unit 205 determines that the immobilizer unit 203 itself is formal, and proceeds to engine operation permission processing. On the other hand, if the two do not coincide, the engine control unit 205 determines that the immobilizer unit 203 or the engine control unit 205 is replaced through a theft, and proceeds immediately to the above engine stop processing, and engine start prohibition processing.

Therefore, a rolling code signal which the immobilizer unit 203 transmits to the engine control unit 205 constitutes substantially an engine operation permission signal, and is referred hereafter to as operation permission signal.

It is noted that the operation permission signal is a signal for permitting continuous operation of the engine which is in operation, and not a signal for permitting start of the engine which is at a standstill.

It is also noted that the ID noncoincidence signal is a signal for stopping the engine which is in operation, and not a signal for prohibiting start of the engine which is at a standstill. A method of stopping engine operation is not limited to a method of stopping operation of the fuel supply system, and a method of stopping operation of ignition controller.

It is also noted that engine start permission means that start of the engine which is at a standstill is permitted, and that engine start prohibition means that start of the engine which is at a standstill is prohibited. These engine start permission and prohibition are invalid for the engine which is already in operation.

The starter drive circuit 206 is a circuit for actuating, when the key 204 is set to the engine start position ST, a starter motor 264 so as to start the engine. The switch 252 is ordinarily closed to permit engine start, so that when closing an ignition start switch 262, a current passes from a battery BAT to a relay coil 263c through a fuse 261, turning on a relay 263. Thus, a relay contact 263a is closed to supply a power from the battery BAT to the starter motor 264 through the fuse 261, ignition start switch 262, and relay contact 263a, actuating the starter motor 264. As described above, when determining that normal start operation of the engine is not carried out, the engine control unit 205 opens the switch 252, so that the relay 263 is turned off to open the relay contact 263a, preventing actuation of the starter motor 264. Therefore, the engine cannot be started.

Figure 10:
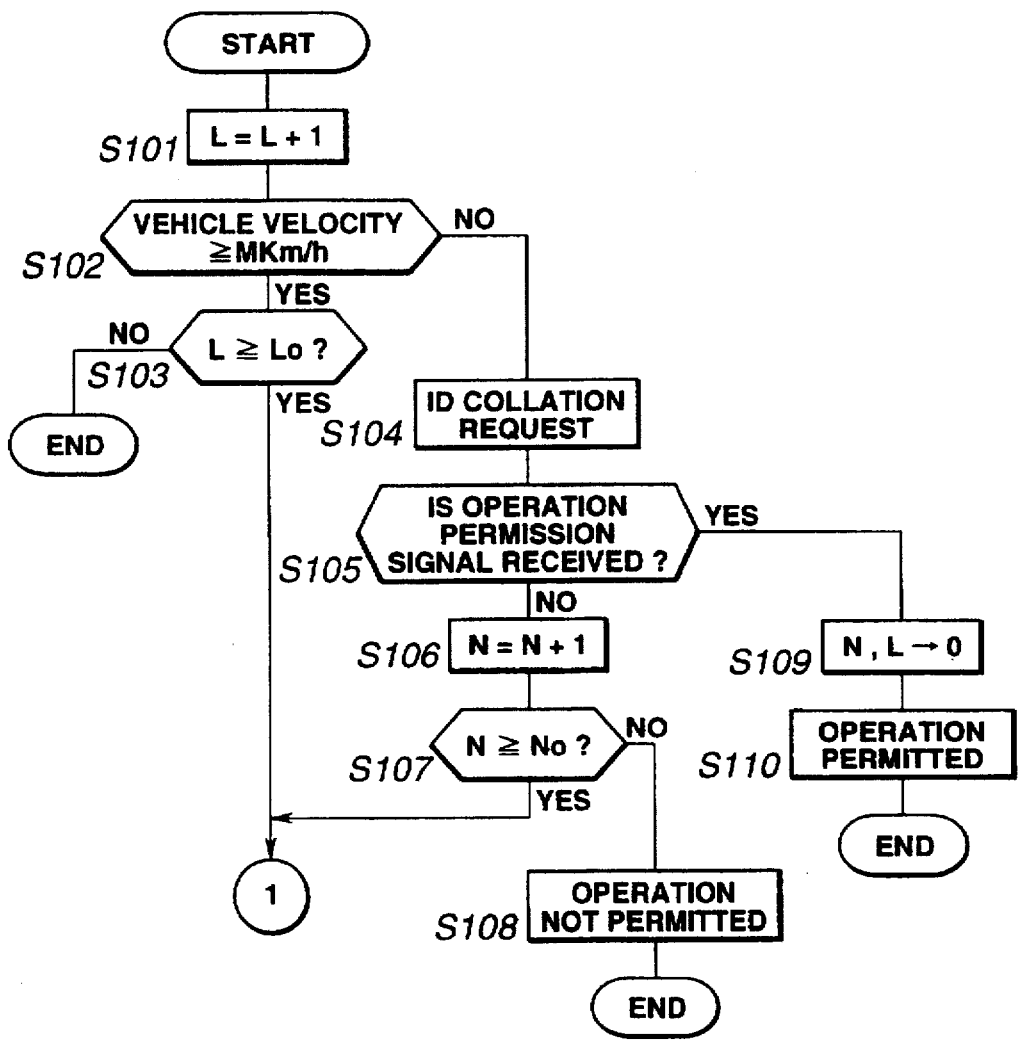
FIG. 10 is a view similar to FIG. 7, showing operation of the engine control unit of FIG. 8.
Figure 11:
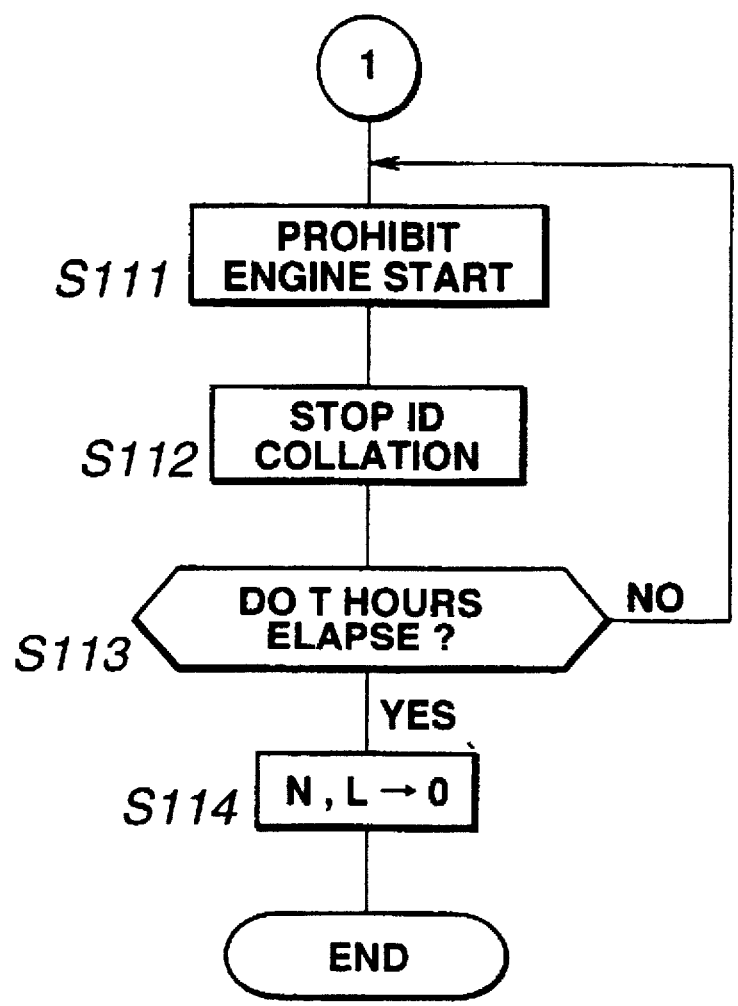
FIG. 11 is a view similar to FIG. 10, showing operation of the engine control unit subsequent to FIG. 10.

FIGS. 10 and 11 are flowcharts showing operation of the engine control unit 205. Referring to FIGS. 10 and 11, operation of the second embodiment will be described.

When the switch 253 is closed through engine start operation by the key 204, the engine control unit 205 starts control as shown in FIGS. 10 and At a step S101, a counter is incremented which counts a number of times that the switch 253 is closed, i.e. a number of times L of engine start operation by the key 204, then, control proceeds to a step S102 where it is determined whether or not the cruising speed V of the motor vehicle detected by the speed detector 254 is greater than a predetermined speed M (km/h). If the cruising speed V is greater than the predetermined speed M, control proceeds to a step S103, whereas if not, control proceeds to a step S104. When the cruising speed V is greater than the predetermined speed M, it is determined at the step S103 whether or not the count number L of the counter is equal to or greater than a predetermined number Lo, i.e. the number of times L of engine start operation by the key 204 comes to the predetermined number Lo. If L≧Lo, control proceeds to a step S111, whereas if not, control comes to an end.

On the other hand, at the step S102, if it is determined that the cruising speed V is smaller than the predetermined speed M, control proceeds to a step S104 where the ID collation request signal is transmitted to the immobilizer unit 208. At a subsequent step S105, it is determined whether or not the rolling code or operation permission signal is received from the immobilizer unit 203. If the operation permission signal is received, control proceeds to a step S109, whereas if not, control proceeds to a step S106.

When the immobilizer unit 203 transmits the ID noncoincidence signal in connection with an ID collation request, it is determined that engine start operation was carried out by the key 204 with the ID number not registered, so that at the step S106, a counter is incremented which counts a number of times N of noncoincidence of the ID number, and control proceeds to a step S107. At the step S107, it is determined whether or not the count number N of the counter is equal to or greater than a predetermined number No, i.e. the number of times N of noncoincidence of the ID number comes to the predetermined number No. If N≧No, control proceeds to the step S111, whereas if not, control proceeds to a step S108.

At the step S108, due to receiving of the ID noncoincidence signal, the fuel supply system and the ignition controller are stopped to stop the engine which is in operation.

On the other hand, when receiving the operation permission signal from the immobilizer unit 203, it is determined that the key 204 used for engine start operation is a registered key, and that the immobilizer unit 203 is formal, so that at the step S109, the count numbers N, L are reset to 0. At a subsequent step S110, engine operation is permitted.

When the cruising speed V is greater than the predetermined speed M, and the number of times L of engine start operation comes to the predetermined number Lo, or when the number of times N of noncoincidence of the ID number comes to the predetermined number No, it is determined that normal start operation of the engine is not carried out, so that at the step S111, engine start is prohibited. That is, as described above, the switch 252 is opened to prohibit actuation of the starter motor 264. It is noted that at that time, operation of the fuel supply system and the ignition controller may be stopped simultaneously. At a subsequent step S112, an ID collation request to the immobilizer unit 203 is stopped to stop ID number collation by the immobilizer unit 203.

At a subsequent step S113, it is determined whether or not prohibition of engine start and stop of ID number collation are continued during T hours. If T hours elapse, control proceeds to a step S114, whereas if not, control returns to the step S111. When prohibition of engine start and stop of ID number collation are continued during T hours, at the step S114, not only the count numbers N, L are reset to 0, but the switch 252 is closed, and control comes to an end. Thus, prohibition of engine start and stop of ID collation are released after T hours, permitting engine start operation by the key 204 again.

In such a way, with the anti-theft car protection system which gives priority to engine start up to completion of ID number collation, when detecting the cruising speed over a predetermined speed, and having the number of times of engine start operation equal to a predetermined number, not only ID number collation is stopped, but engine start is prohibited during a predetermined period of time, resulting in prevention of wastefully consumed power of the battery by repetition of engine start due to the use of a key other than the formal key such as a sub key, and improvement of the anti-theft performance due to stop of ID number collation during a predetermined period of time.

Moreover, with the anti-theft car protection system which gives priority to engine start up to completion of ID number collation, when having the number of times of noncoincidence of the ID number equal to a predetermined number, not only ID number collation is stopped, but engine start is prohibited during a predetermined period of time, resulting in the same effect as described above.

Figure 12:
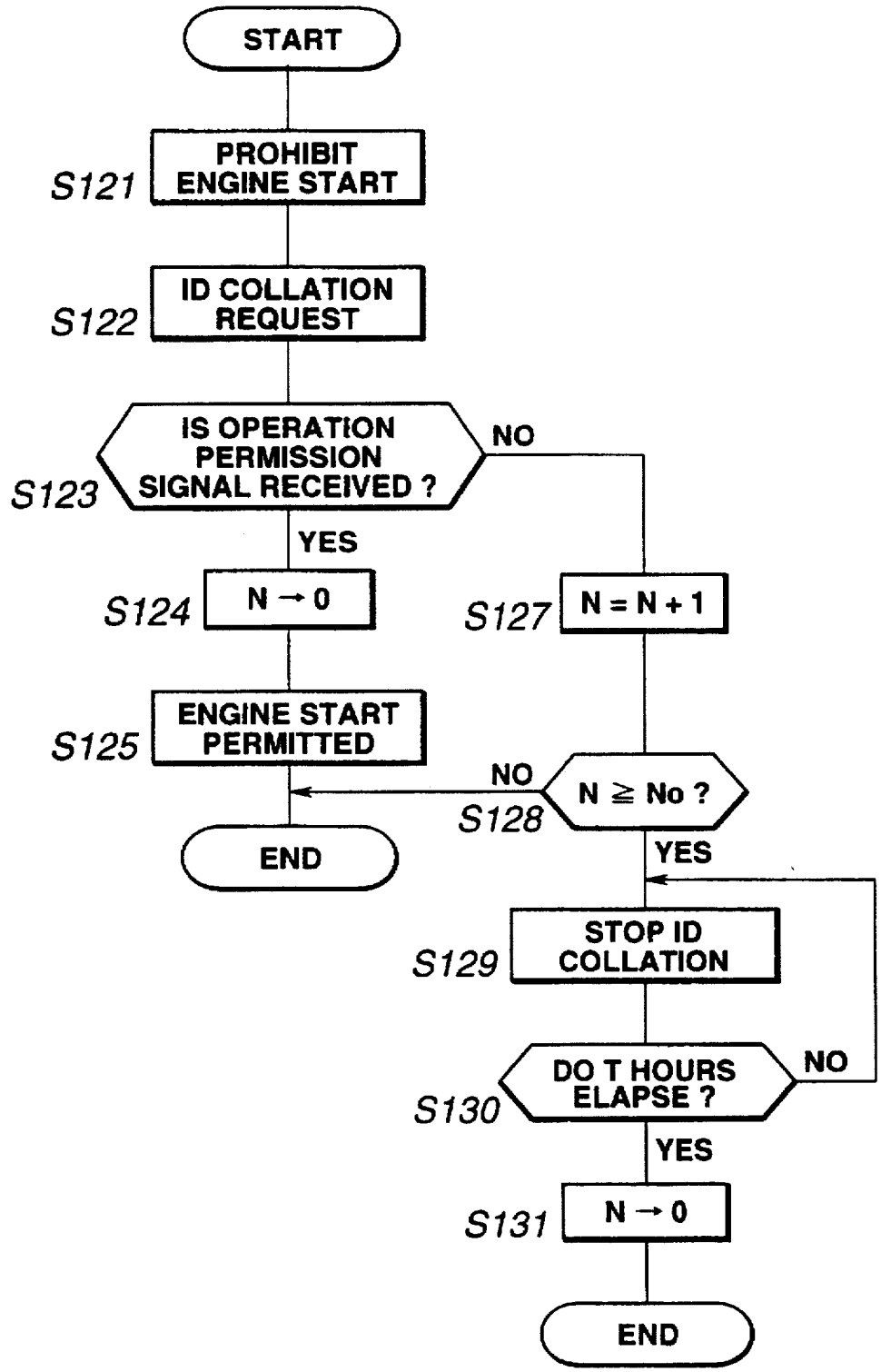
FIG. 12 is a view similar to FIG. 11, showing a third preferred embodiment of the present invention.

FIG. 12 shows a third embodiment of the present invention. In the second embodiment, in order to avoid a waiting of engine start up to completion of ID number collation, engine start has priority up to completion of ID number collation, and engine operation permission or stop is carried out in accordance with a collation result upon completion of ID number collation. On the other hand, in the third embodiment, engine start is not permitted up to completion of ID number collation at the sacrifice of startability of the engine, and engine start permission or prohibition is carried out in accordance with a collation result upon completion of ID number collation.

The structure of the third embodiment is substantially the same as that of the second embodiment as shown in FIGS. 8 and 9.

In the third embodiment, the engine control unit 205 opens the switch 252 ordinarily, and closes it when receiving an engine operation permission signal from the immobilizer unit 203. That is, the engine control unit 205 prohibits actuation of the starter motor 264 until the immobilizer unit 208 transmits an engine operation permission signal.

FIG. 12 is a flowchart showing operation of the engine control unit 205. Referring to FIG. 12, operation of the third embodiment will be described.

When the switch 253 is closed through engine start operation by the key 204, the microcomputer of the engine control unit 205 starts control as shown in FIG. 12. At a step S121, even if the key 204 is turned to the engine start position ST, engine start is prohibited with the switch 252 opened. As described above, in the third embodiment, since the engine control unit 205 does not close the switch 252 up to receiving of an engine operation permission signal, and actuation of the starter motor 264 is prohibited, the engine is not started. It is noted that at that time, the fuel supply system and the ignition controller may be stopped simultaneously.

At a step S122, an ID collation request signal is transmitted to the immobilizer unit 203, and at a subsequent step S123, it is determined whether or not the rolling code or engine operation permission signal is received form the immobilizer unit 203. When the engine operation permission signal is received from the immobilizer unit 203, control proceeds to a step S124, whereas if not, control proceeds to a step S127.

When the engine operation permission signal is received from the immobilizer unit 203, it is determined that the key 204 used for engine start operation is a registered key, and that the immobilizer unit 203 is formal, and the count number N of the counter for counting a number of times of noncoincidence of the ID number is reset to 0. At a subsequent step S125, the switch 252 is closed to allow actuation of the starter motor 264, permitting engine start. Then, control comes to an end.

On the other hand, when receiving an ID noncoincidence signal, at the step S127, the count number N of the counter is incremented, and at a subsequent step S128, it is determined whether or not the count number N comes to the predetermined number No, i.e. the number of times N of noncoincidence of comes to the predetermined number No. If $N \geq No$, control proceeds to a step S129, whereas if not, control comes to an end.

When the ID noncoincidence number N comes to the predetermined number No, at the step S129, an ID collation request to the immobilizer unit 203 is stopped to stop ID collation by the immobilizer unit 203. At a subsequent step S130, it is determined whether or not stop of ID collation is continued during T hours. If T hours elapse, control proceeds to a step S131, whereas if not, control returns to the step S129. When stop of ID collation is continued during T hours, at the step S131, the count number N is reset to 0, and control comes to an end.

In such a way, with the anti-theft car protection system which prohibits engine start up to completion of ID number collation, when having the number of times of noncoincidence of ID number equal to a predetermined number, ID number collation is stopped during a predetermined period of time, resulting in prevention of wastefully consumed power of the battery by repetition of engine start due to the use of a key other than the formal key such as a sub key, and improvement of the anti-theft performance due to stop of ID number collation during a predetermined period of time.

Figure 13:
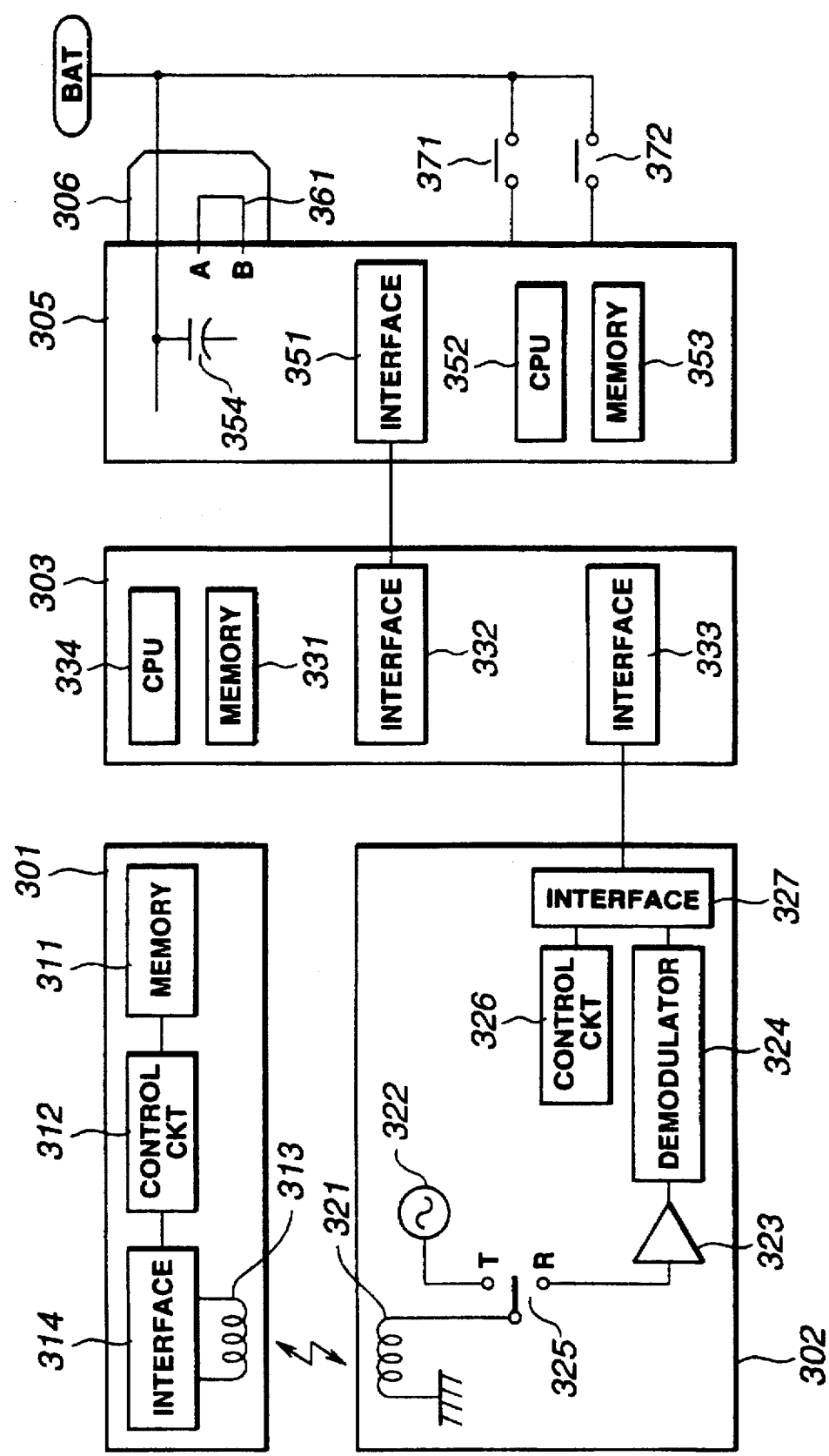
FIG. 13 is a view similar to FIG. 8, showing a fourth preferred embodiment of the present invention.

FIGS. 13–19 show a fourth embodiment of the present invention. Referring to FIG. 13, the alit-theft car protection system comprises a transponder 301, an antenna unit 302, an immobilizer unit 303, an engine control unit 305, and a connector 306.

Figure 14:
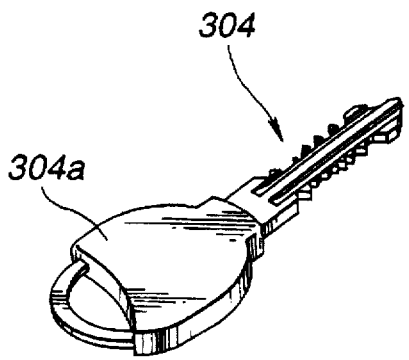
FIG. 14 is a view similar to FIG. 9, illustrating the key.

Referring also to FIG. 14, the transponder 301 is embedded in a head portion 304a of a key 304, and is provided with a nonvolatile memory 311 such as EEPROM in which an ID number of the key 304 is previously stored, a control circuit 312 for controlling communication with the antenna unit 302, and an interface 314 for ensuring communication with the antenna unit 302 through an antenna 313. The interface 314 includes a capacitor, and serves to receive and rectify pulse-signal waves of a predetermined frequency, which is accumulated in the capacitor so as to serve as a power upon ID number transmission. When receiving pulse-signal waves of a predetermined frequency from the antenna unit 302, the control circuit 312 reads the ID number out of the memory 311 by using a power of pulse-signal waves, which is transmitted to the antenna unit 302 of the motor vehicle through the interface 314.

The antenna unit 302 is arranged in an ignition key cylinder, not shown, of the motor vehicle, and is provided with an oscillator 322 for generating a pulse signal of a predetermined frequency to be transmitted to the transponder 301, an amplifier 323 for amplifying a signal received from the transponder 301, a demodulator 324 for demodulating the received signal to the ID number, a switch 325 for connecting the oscillator 322 to the antenna 321 upon signal transmission, and the amplifier 323 to the antenna 321 upon signal receiving, a control circuit 326 for controlling communication with the transponder 301 in accordance with a command out of the immobilizer unit 303, and an interface 327 for ensuring communication with the immobilizer unit 303. When receiving a power transmission command out of the immobilizer unit 323 through the interface 327, the control circuit 326 changes the switch 325 to a contact T so as to transmit to the transponder 301 through the antenna 321 a pulse signal of a predetermined frequency generated by the oscillator 322 during a predetermined period of time. This transmission time is determined to be sufficient for accumulating a transmission power in the interface 314 of the transponder 301. As soon as transmission is completed, the switch 325 is changed to a contact R so as to receive signal waves transmitted by the transponder 301, which are amplified by the amplifier 323, and demodulated to the ID number through the demodulator 324.

The immobilizer unit 303 comprises a microcomputer 334 and peripheral parts such as a nonvolatile memory 331, interfaces 332, 333, etc., and serves to ensure communication with the antenna unit 302 through the interface 333 in response to an ID collation request out of the engine control unit 305, and read the ID number of the key 304 through the antenna unit 302, which is collated with that one as previously registered in the memory 331. Moreover, the immobilizer unit 303 ensures communication with the engine control unit 305 through the interface 332 so as to transmit a collation result of the ID number in response to an ID collation request of the engine control unit 305.

The engine control unit 305 is provided with a microcomputer 352, peripheral parts such as an interface 351 and a memory 353, an auxiliary power source capacitor 354, etc., and serves to carry out start, stop and speed adjusting of an engine, not shown, and ensure communication with the immobilizer unit 303 through the interface 351 to request ID number collation and receive a result thereof. When receiving an ID noncoincidence signal from the immobilizer unit 808, the engine control unit 805 stops not only operation of a fuel supply system, not shown, for supplying fuel to the engine, but operation of an ignition controller, not shown, for carrying out ignition control of the engine, thus stopping the engine.

Connected to the engine control unit 305 are the connector 306 for supplying a power out of a battery BAT, a switch 371 which is closed when the key 304 is set to an engine start position ST, and a switch 372 which is closed when the key 304 is set to an engine operation position ON or the engine start position ST. Upon disconnection of the connector 306, the auxiliary power source capacitor 354 supplies a power to the engine control unit 305 during a predetermined period of time so as to continue operation thereof. Arranged in the connector 306 is a jumper 361 for short-circuiting terminals A and B on the side of the engine control unit 305. When the connector 306 is connected to the engine control unit 305, the terminals A and B are short-circuited by the jumper 361, whereas when the connector 306 is disconnected therefrom, the terminals A and B are opened. The terminals A, B are connected to the microcomputer 352. When the terminals A and B are opened, the microcomputer 352 undergoes an interrupt, executing an interrupt routine as will be described later.

Communication between the immobilizer unit 303 and the engine control unit 305 with regard to ID collation is ensured in accordance with the following procedure:

1) ID collation request

When detecting through the switch 371 that engine start operation is made by the key 304, the engine control unit 305 actuates a starter, not shown, fuel supply system, and ignition controller to start the engine, and transmits an ID collation request signal to the immobilizer unit 303.

2) ID coincidence/noncoincidence signal

When receiving an ID collation request signal from the engine control unit 305, the immobilizer unit 303 reads the ID number from the transponder 301 of the key 304 through the antenna unit 302, which is collated with that one as previously registered. In connection with a collation result, the immobilizer unit 303 transmits an ID coincidence signal or ID noncoincidence signal to the engine control unit 305.

When receiving an ID noncoincidence signal from the immobilizer unit 303, the engine control unit 305 stops immediately the fuel supply system and the ignition controller as described above, stopping the engine.

On the other hand, when receiving an ID coincidence signal, the engine control unit 305 confirms whether or not the immobilizer unit 303 itself is formal in accordance with the following procedure without immediately carrying out engine operation permission processing:

3) Rolling code transmission request

The engine control unit 305, which received an ID coincidence signal from the immobilizer unit 303, requests transmission of a rolling code from the immobilizer unit 303. This rolling code is set by the engine control unit 305 upon previous engine stop, and is transmitted to the immobilizer unit 303 for store in the memory 331.

4) Transmission of rolling code

The immobilizer unit 303, which received a rolling code transmission request from the engine control unit 305, transmits to the engine control unit 305 the rolling code received from the engine control unit 305 upon previous engine stop and stored in the memory 331.

The engine control unit 305, which received the rolling code from the immobilizer unit 303, collates the rolling code with that one transmitted to the immobilizer unit 303 upon previous engine stop. If the two coincide, the engine control unit 305 determines that the immobilizer unit 303 itself is formal, and proceeds to engine operation permission processing. On the other hand, if the two do not coincide, the engine control unit 305 determines that the immobilizer unit 303 or the engine control unit 305 is replaced through a theft, and proceeds immediately to the above engine stop processing, and engine start prohibition processing.

Therefore, a rolling code signal which the immobilizer unit 303 transmits to the engine control unit 305 constitutes substantially an engine operation permission signal, and is referred hereafter to as operation permission signal.

The memory 353 of the engine control unit 305 is a nonvolatile memory such as EEPROM, and serves to store a rolling code, i.e. an engine operation permission signal, transmitted from the immobilizer unit 303.

It is noted that the engine operation permission signal is a signal for permitting continuous operation of the engine which is in operation, and not a signal for permitting start of the engine which is at a standstill.

It is also noted that the ID noncoincidence signal is a signal for stopping the engine which is in operation, and not a signal for prohibiting start of the engine which is at a standstill. A method of stopping engine operation is not limited to a method of stopping operation of the fuel supply system, and a method of stopping operation of ignition controller.

It is also noted that engine start permission means that start of the engine which is at a standstill is permitted, and that engine start prohibition means that start of the engine which is at a standstill is prohibited. These engine start permission and prohibition are invalid for the engine which is already in operation.

Figure 15:
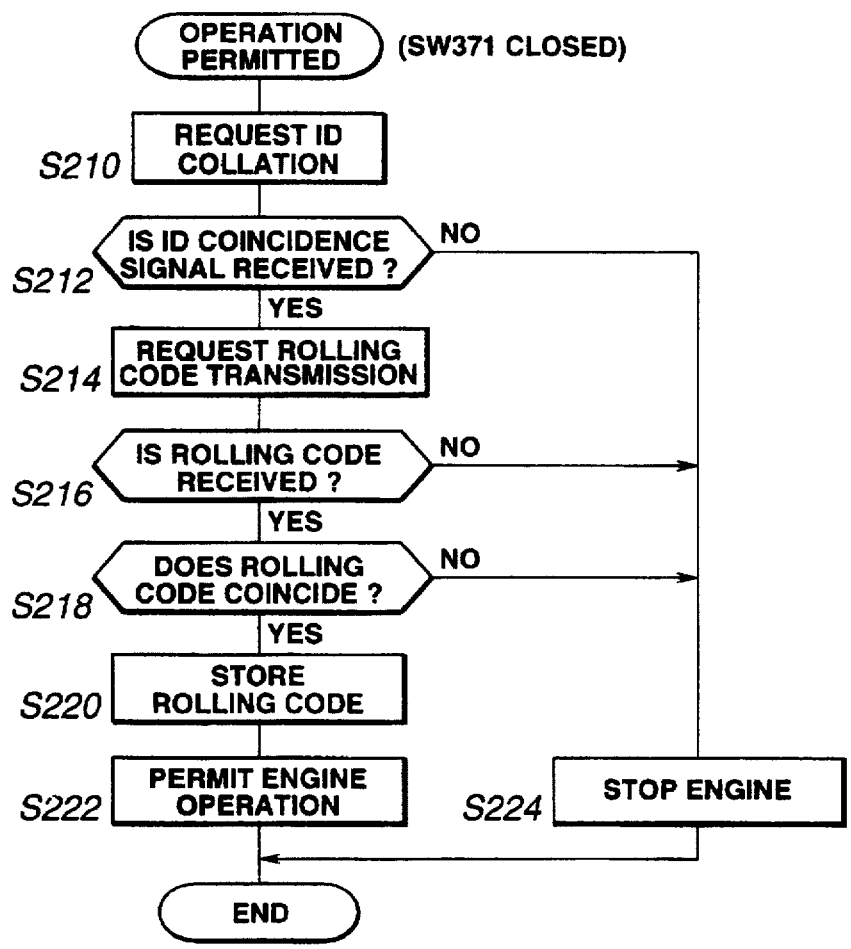
FIG. 15 is a view similar to FIG. 12, showing an operation permission processing program of the engine control unit.

FIG. 15 is a flowchart showing an operation permission processing program of the engine control unit 305. Referring to FIG. 15, an operation permission processing of the engine control unit 305 will be described.

When detecting through the switch 371 that an engine start operation is carried out by the key 304, the microcomputer 352 of the engine control unit 305 starts execution of the program. At a step S210, ID number collation of the key 304 used for start operation is requested of the immobilizer unit 303. At a subsequent step S212, it is determined whether or not an ID coincidence signal is received from the immobilizer unit 303. If the ID coincidence signal is received, an operation permission processing after a step S214 is carried out. On the other hand, if an ID noncoincidence signal is received from the immobilizer unit 303, or no response is received therefrom, control proceeds to a step S224 where operation of the fuel supply system and the ignition controller is stopped to stop the engine.

When the ID coincidence signal is received from the immobilizer unit 303 with respect to an ID collation request, at the step S214, transmission of a rolling code is requested of the immobilizer unit 303 so as to confirm whether or not the immobilizer unit 303 and the engine control unit 305 are formal. The rolling code is a code transmitted to the immobilizer unit 303 upon previous engine stop, and stored in the memory 331. At a step S216, it is determined whether or not a rolling code is received from the immobilizer unit 303. If the rolling code is received, control proceeds to a step S218, whereas if not, control proceeds to a step S224 to stop the engine. When receiving the rolling code, at the step S218, the rolling code as received is collated with that one stored in the memory 353 and transmitted to the immobilizer unit 303 upon previous engine stop. If the two coincide, control proceeds to a step S220, whereas if not, control proceeds to the step S224 to stop the engine. At the step S220, due to the fact that the rolling code transmitted to the immobilizer unit 303 upon previous engine stop coincides with that one currently transmitted from the immobilizer unit 303, it is determined that the immobilizer unit 303 and the engine control unit 305 are formal, storing as an operation permission signal the rolling code in the memory 353. At a subsequent step S222, continuous operation of the engine is permitted.

Figure 16:
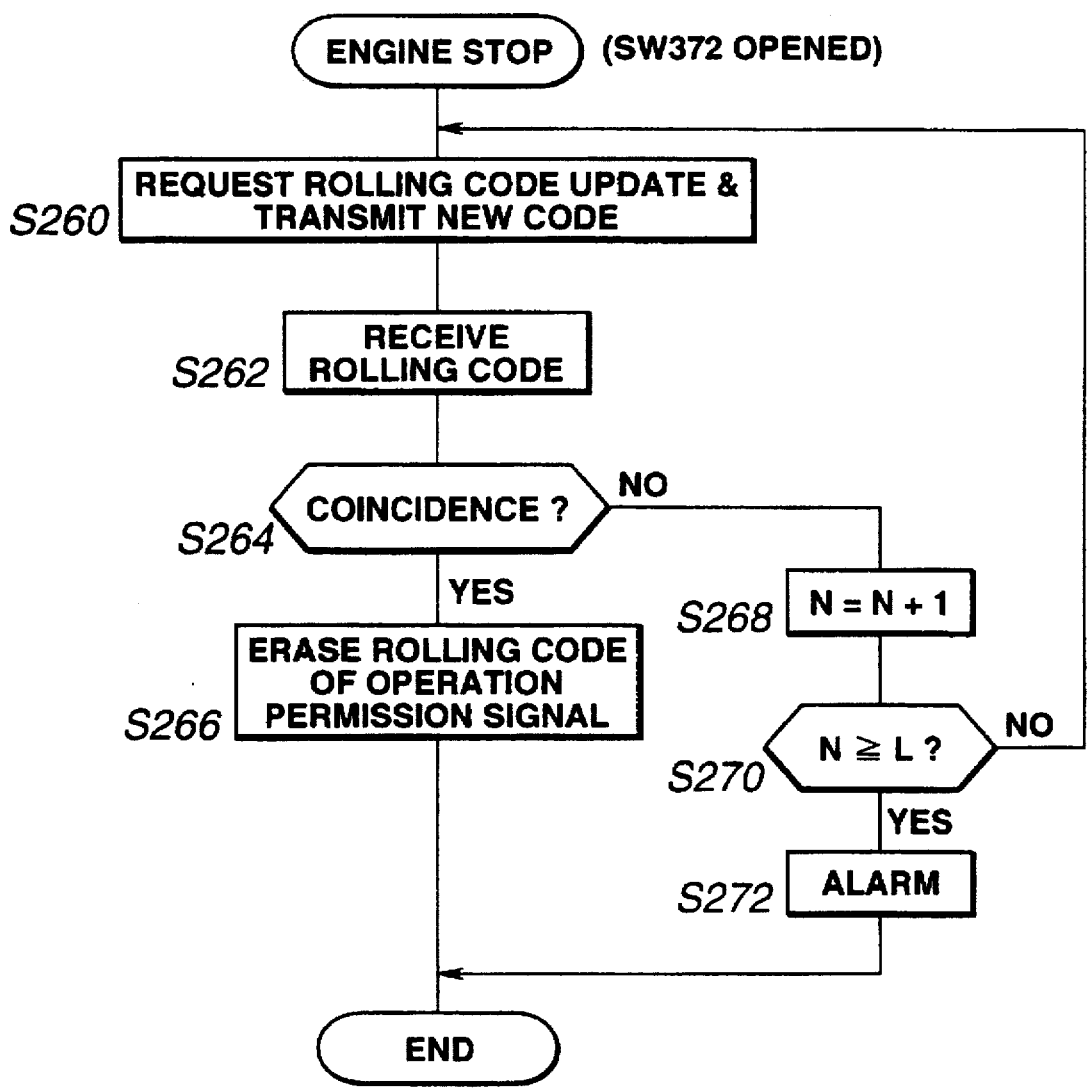
FIG. 16 is a view similar to FIG. 15, showing an engine stop processing program of the engine control unit.

FIG. 16 is a flowchart showing an engine stop processing program of the engine control unit 305. Referring to FIG. 16, an engine stop processing of the engine control unit 305 will be described.

When detecting through the 372 that engine stop operation is carried our by the key 304, the microcomputer 352 of the engine control unit 305 starts execution of the program. At a step S260, update of the rolling code is requested of the immobilizer unit 303, and a new rolling code is transmitted and stored in the memory 353. A code read at random out of a plurality of codes stored in the memory 353 serves as a rolling code.

The immobilizer unit 303 which receives a rolling code update request stores the new rolling code sequentially transmitted, which is returned to the engine control unit 305 so as to notify completion of a rolling code update processing.

At a step S262, the new rolling code returned from the immobilizer unit 303 is received, and collated with the rolling code transmitted previously for update. At a subsequent step S264, it is determined whether or not the two coincide. If the two coincide, control proceeds to a step S266, whereas if not, control proceeds to a step S268. When the rolling code transmitted for update coincides with the new one returned from the immobilizer unit 303, it is determined that update of the rolling code is completed in the immobilizer unit 303 and the engine control unit 305, and at the step S266, the new rolling code is stored as an operation permission signal in the memory 353.

On the other hand, when the rolling code as transmitted does not coincide with the new one as returned, it is determined that update of the rolling code is not completed, and at the step S268, a number of times N of noncoincidence is incremented. At a subsequent step S270, it is determined whether or not the noncoincidence number N is equal to or greater than a predetermined number L. If $N \geq L$, control proceeds to a step S272 where an alarm is given, then, control comes to an end. On the other hand, if $N<L$, control returns to the step S260 to repeat the above engine stop processing.

Figure 17:
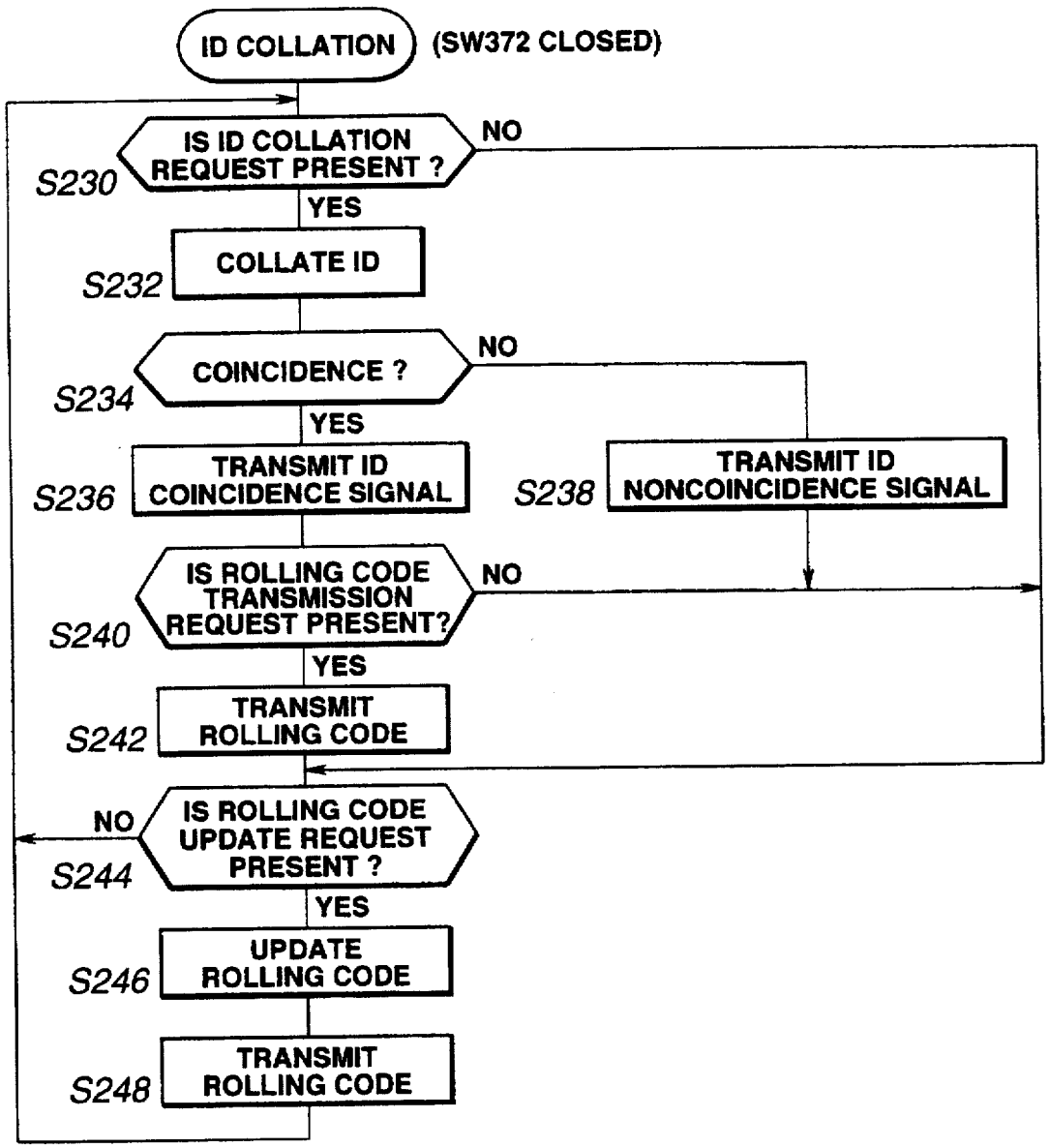
FIG. 17 is a view similar to FIG. 16, showing an ID collation processing program of the immobilizer unit.

FIG. 17 is a flowchart showing an ID collation processing program of the immobilizer unit 303. Referring to FIG. 17, an ID collation processing will be described.

When detecting through the switch 372 that the key 304 is set to the engine start position ST or the engine operation position ON, the microcomputer 334 of the immobilizer unit 303 starts execution of the program.

At a step S230, it is determined whether or not an ID collation request is made out of the engine control unit 305. If an ID collation request is made, control proceeds to a step S232, whereas if not, control proceeds to a step S244. When an ID collation request is made, at the step S232, an ID number set in the transponder 301 of the key 304 is read through the antenna unit 302 as described above, and is collated with a registered number stored in the memory 331. At a subsequent step S234, it is determined whether or not the ID number of the key 304 which is being applied coincides with the registered number. If the ID number coincides with the registered number, control proceeds to a step S236, whereas if not, control proceeds to a step S238.

When the key 304 which is being applied corresponds to the registered key, at the step S236, an ID coincidence signal is transmitted to the engine control unit 305. At a subsequent step S240, it is determined whether or not a rolling code transmission request is made from the engine control unit 305. If a rolling code transmission request is made, control proceeds to a step S242, whereas if not, control proceeds to the step S244. When a rolling code transmission request is made, at the step S242, a rolling code received and stored upon previous engine stop is read out of the memory 331, and transmitted to the engine control unit 305.

On the other hand, when a nonregistered key is being applied, at the step S338, an ID noncoincidence signal is transmitted to the engine control unit 305, then, control proceeds to the step S244.

At the step S244, it is determined whether or not a rolling code update request is made from the engine control unit 305. If a rolling code update request is made, control proceeds to a step S246, whereas if not, control returns to the step S230. When a rolling code update request is made, at the step S246, a new rolling code is received from the engine control unit 305, and stored in the memory 331. At a subsequent step S248, the new rolling code is returned to the engine control unit 305 so as to notify completion of a rolling code update processing.

Figure 18:
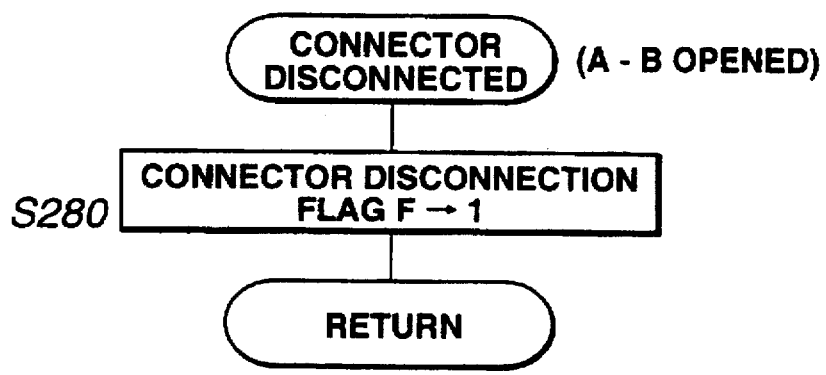
FIG. 18 is a view similar to FIG. 17, showing a connector disconnection interrupt routine of the engine control unit.

FIG. 18 is a flowchart showing a connector disconnection interrupt routine of the engine control unit 305.

When the connector 306 of the engine control unit 305 is disconnected, the terminals A and B are opened as described above. Thus, the microcomputer 352 of the engine control unit 305 undergoes an interrupt, and executes the interrupt routine. That is, at a step S280, a flag F is set which serves to store disconnection of the connector 380.

Figure 19:
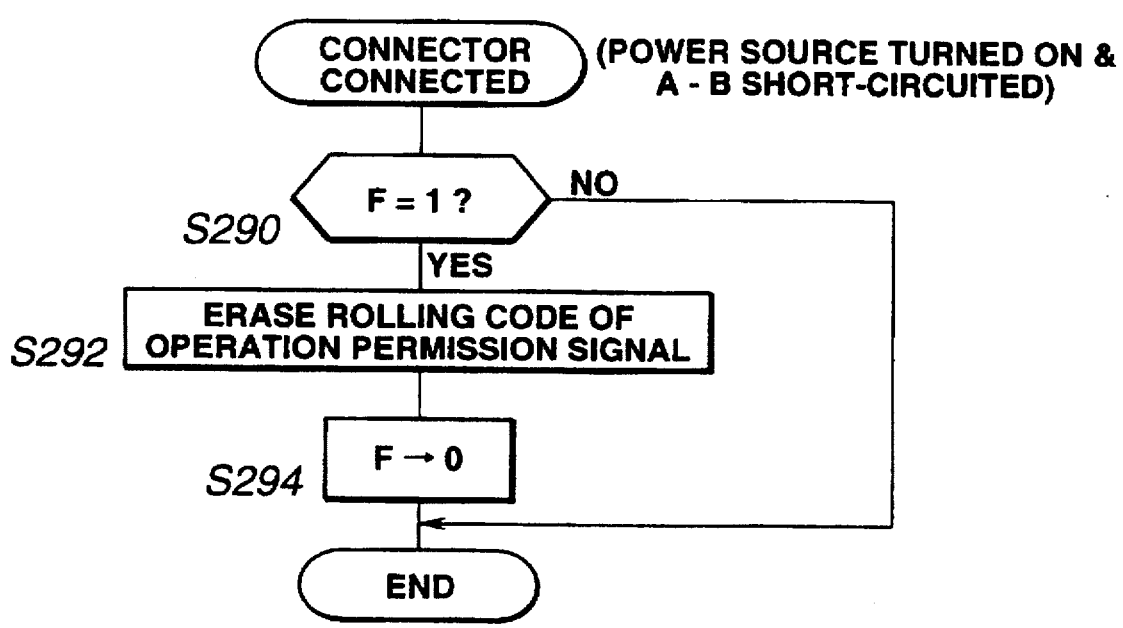
FIG. 19 is a view similar to FIG. 18, showing a connector connection interrupt routine of the engine control unit.

FIG. 19 is a flowchart showing a connector connection interrupt routine of the engine control unit 305.

When the connector 306 of the engine control unit 305 is connected to supply a power of the battery BAT to the engine control unit 305, and the terminals A and B are short-circuited by the jumper 361, the microcomputer 352 of the engine control unit 305 executes the interrupt routine.

At a step S290, it is determined whether or not the connector disconnection flag F is set. If the flag F is set, control proceeds to a step S292, whereas if not, control comes to an end. When the flag F is set, the connector 306 has been disconnected for some reason, so that at the step S292, the rolling code is erased if it is stored as an operation permission signal in the memory 353. At a subsequent step S294, the flag F is reset, then, control comes to an end.

Figure 20:
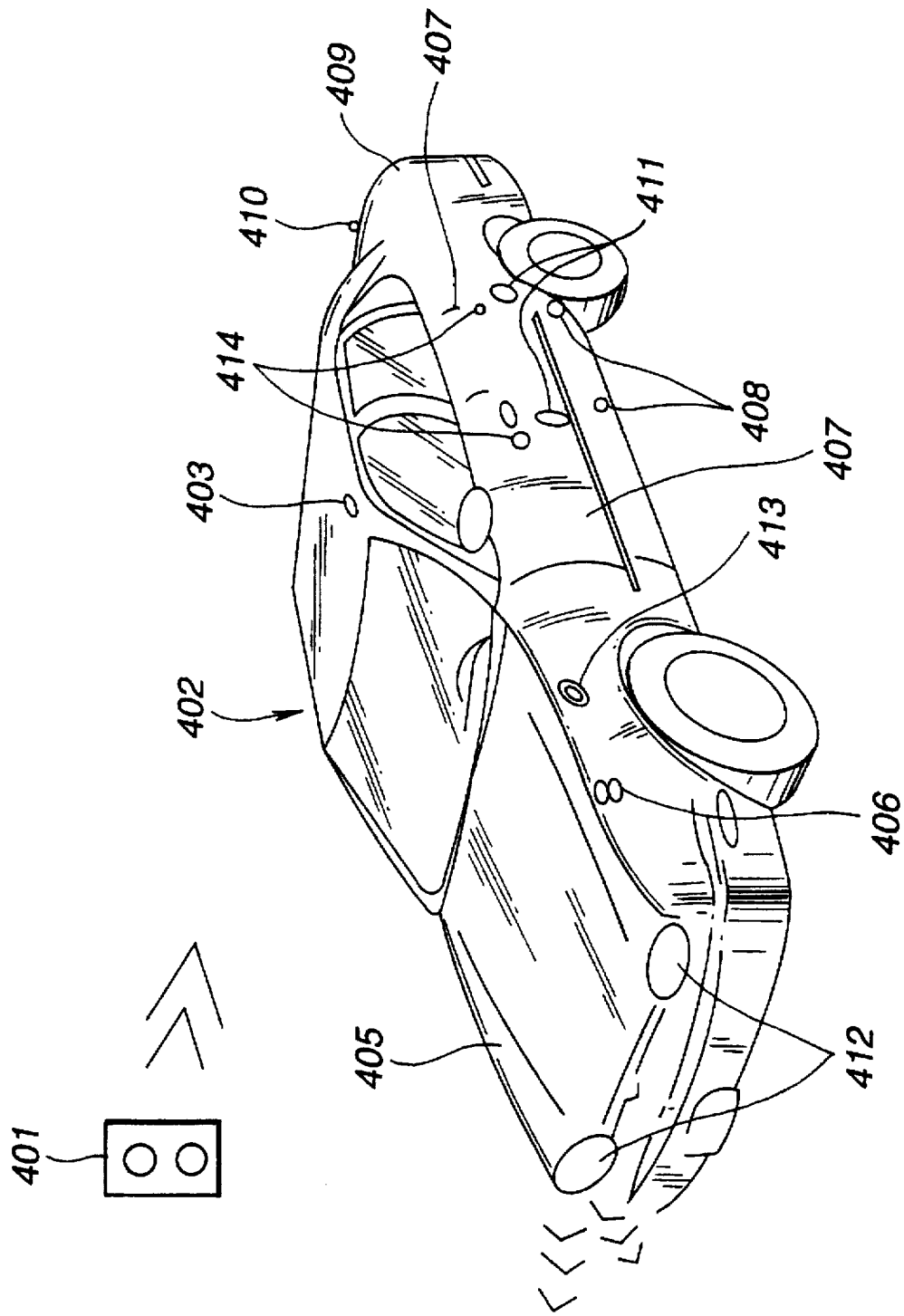
FIG. 20 is a view similar to FIG. 14, illustrating a motor vehicle to which a fifth preferred embodiment of the present invention is applied.

FIGS. 20–24 show a fifth embodiment of the present invention. Referring to FIG. 20, a portable equipment 401 is carried by an owner of the motor vehicle 402 with him at all times. The portable equipment 401 has a rectangular thin casing in which a circuit substrate is arranged having an electronic circuit for returning a proper code as previously fixedly stored to the motor vehicle 402 in response to receiving of a transmission request signal from the motor vehicle. In the fifth embodiment, radiocommunication between the portable equipment 401 and the motor vehicle 402 is ensured through radio waves. The other communication mediums may be used such as ultrasonic waves, infrared rays, and laser beams.

Figure 21:
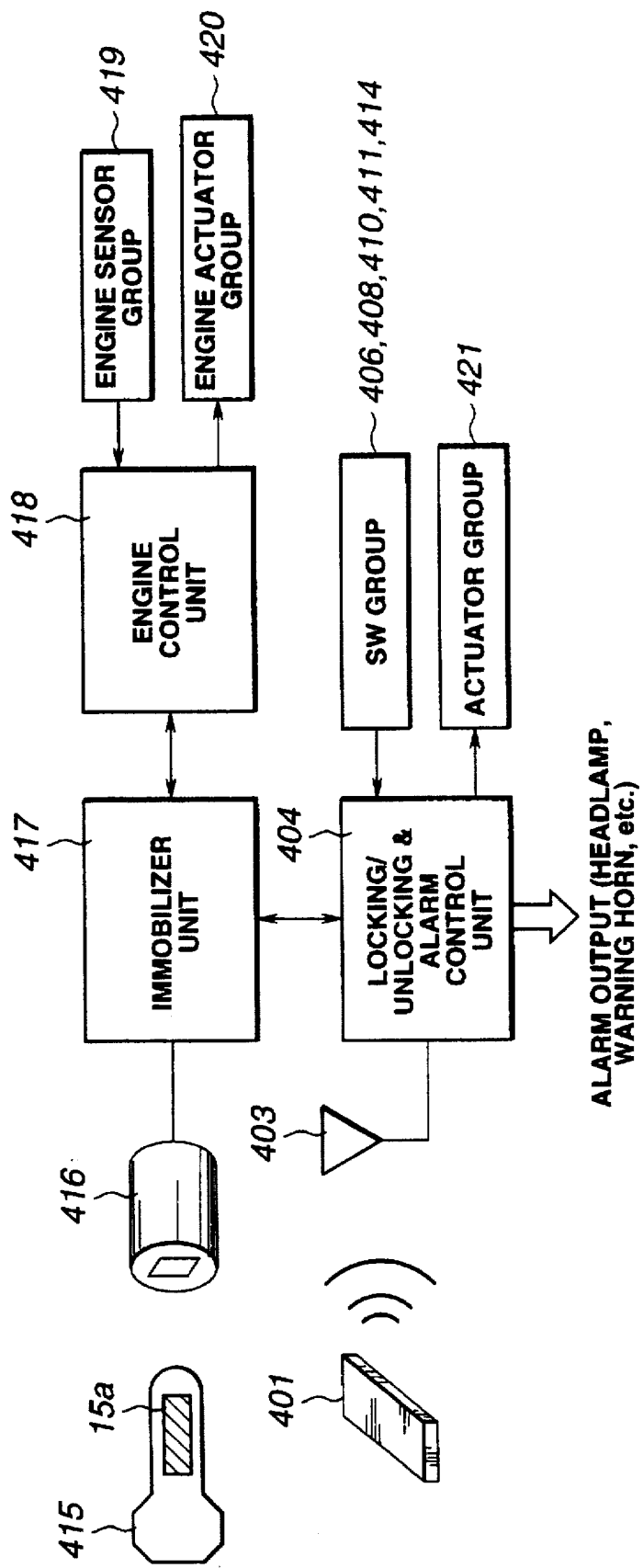
FIG. 21 is a view similar to FIG. 13, showing a fifth preferred embodiment of the present invention.

On the other hand, referring to FIG. 21, the motor vehicle 402 includes a locking/unlocking and alarm control unit 404 for carrying out collation of a proper code through a transmission/receiving antenna 403, and conducting setting/resetting of the locking/unlocking and alerted state in response to at least a collation result. The locking/unlocking and alarm control unit 404 is accommodated, for example, inside a hood 405. A processing of radiocommunication ensured between the portable equipment 401 and the locking/unlocking and alarm control unit 404 will be described in detail later in accordance with a flowchart in FIG. 22.

Moreover, the motor vehicle 402 includes a hood switch 406 for detecting the open and closed state of the hood 405, door switches 408 for detecting the open and closed state of doors 407, a trunk switch 410 for detecting the open and closed state of a trunk 409, and key cylinder tamper switches 411 for detecting removal of key cylinders built in the doors 7, by which various acts related to a car theft can be detected. In the fifth embodiment, also built in the door 7 is a lock switch, not shown, for detecting whether or not a door lock is set or released, by which the set and released state of the door lock can be detected. That is, as will be described later, the lock switch detects an act that the door lock is released by inserting a mechanical key into the key cylinder of the door 7. A processing of giving an alarm due to unfair opening of the door, etc. will be described in detail later in accordance with a flowchart in FIG. 23.

Additionally, headlamps 412 of the motor vehicle 402 serve to ensure a visual alarm action, whereas a warning horn 413 thereof serves to ensure an auditory alarm action. Door operation switches 14 mounted to the doors 7 serve to provide an opening/closing command to the doors 7 in case of wireless locking/unlocking thereof by the portable equipment 401. This door opening/closing operation will be also described in detail later in accordance with the flowchart in FIG. 22.

FIG. 21 is a block diagram showing an example of a hardware construction of the anti-theft car protection system.

Referring to FIG. 21, a mechanical key 415 is carried by the owner of the motor vehicle 402 with him at all times, and is used, as is well known, for start of the engine, opening/closing of the doors and trunk, etc. Built in the mechanical key 415 is a chip 415a having a proper code stored therein. The proper code can be read by high-frequency waves in the electromagnetic-induction way. As is known in various documents, a detail of the chip 415a is not described herein.

A key cylinder 416 is arranged into which the mechanical key 415 is inserted to start the engine. An electromagnetic coil is built in the key cylinder 416 in the way to enclose the mechanical key 415 as inserted, and serves to read, through high-frequency waves passing therethrough, the proper code from the chip 415a of the mechanical key 415.

An immobilizer unit 417 has as a fundamental function to conduct a processing of restrained start of the engine and stop thereof when it is unfairly started by a key switch as directly connected due to destruction of the key cylinder 416. Specifically, the immobilizer unit 417 is controlled globally by a CPU comprising a microprocessor, and can ensure serial communication with the locking/unlocking and alarm control unit 404 and an engine control unit 418 which will be described later.

The engine control unit 418 serves to carry out engine control operation in accordance with signals out of an engine sensor group 419 which is a general term of various sensors necessary to control of the engine, and to output, in response to an operation result, signals necessary to an engine actuator group 420 which is a general term of various actuators necessary to control of the engine. The engine control unit 418 is constructed fundamentally in the same way as in the conventional one except that serial communication can be made with the immobilizer unit 417.

An engine start restraint processing carried out between the immobilizer unit 417 and the engine control unit 418 will be described in detail later in accordance with a flowchart in FIG. 24.

On the other hand, the locking/unlocking and alarm control unit 404 serves to carry out the above wireless locking/unlocking control, and it inputs signals from the switch group 406, 408, 410, 411, 414, and outputs signals to the actuator group 421 comprising a solenoid plunger. In response to alarm output from the locking/unlocking and alarm control unit 404, the headlamps 412 are turned on and off, or the warning horn 413 is driven discontinuously. It is noted that the headlamps 412 may be turned on continuously, or the warning horn 413 may be driven continuously.

Figure 22:
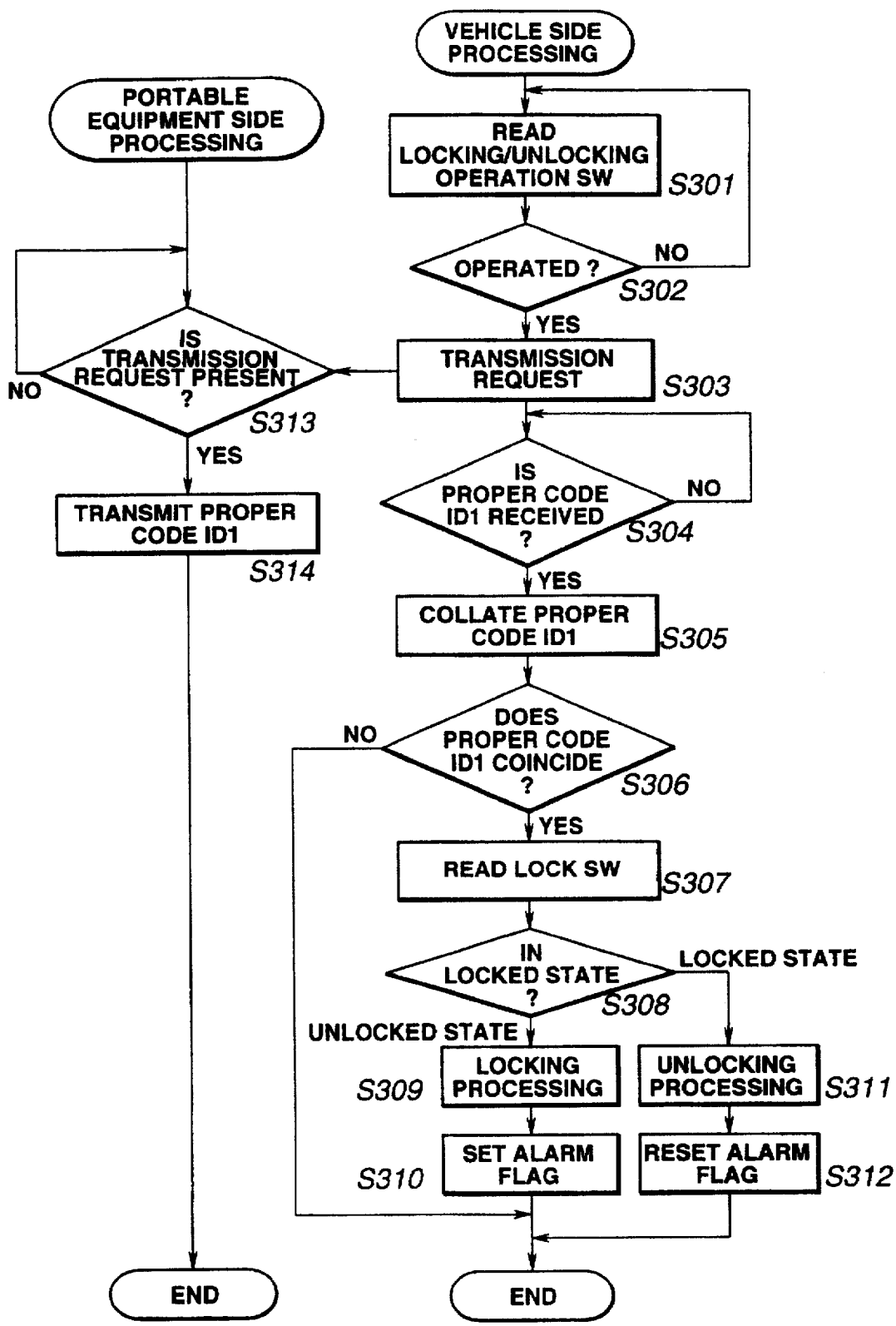
FIG. 22 is a view similar to FIG. 19, showing a remote locking/unlocking control processing carried out between a portable equipment and a locking/unlocking and alarm control unit.

Referring to FIG. 22, a detailed description will be made with regard to a remote locking/unlocking control processing carried out between the portable equipment 401 and the locking/unlocking and alarm control unit 404.

In the locking/unlocking and alarm control unit 404 which constitutes a vehicle side equipment, at a step S301, the state of the door operation switch 414 is read at all times.

At a step S302, it is determined whether or not the door 407 is operated. If the door 407 is not operated, control returns to the step S301. On the other hand, if a driver gets out of the motor vehicle 402, and closes the door 407 to actuate the corresponding door operation switch 414, it is determined that the door 407 is operated, and control proceeds to a step S303. At the step S303, a transmission request signal is immediately transmitted to the portable equipment 401 by wireless through the transmission/receiving antenna 403. At a subsequent step S304, it is determined whether or not a proper code ID1 is returned from the portable equipment 401. If the proper code ID1 is not returned, control at the step S304 is repeatedly carried out.

On the other hand, in the portable equipment 401, at a step S313, it is always determined whether or not a transmission request signal is received from the vehicle side equipment. If no transmission request signal is received, control at the step S313 is repeatedly carried out, whereas if a transmission request signal is received, control proceeds to a step S314 where the proper code ID1 is immediately transmitted to the vehicle side equipment by wireless.

Then, in the vehicle side equipment, at the step S304, it is determined that the proper code ID1 is received, and control proceeds to a step S305 where the proper code ID1 of the portable equipment 401 is collated with that of the vehicle side equipment.

At a subsequent step S306, it is determined whether or not the proper code ID1 of the portable equipment 401 is collated with that of the vehicle side equipment. If the two do not coincide, control comes to an end, carrying out no control with regard to locking/unlocking. Then, a vehicle side processing becomes in the state of waiting operation of the door operation switch 414.

On the other hand, at the step S306, if it is determined that the proper code ID1 of the portable equipment 401 is collated with that of the vehicle side equipment, control proceeds to a step S307 where the state of the door lock is immediately read through the lock switch, not shown. At a subsequent step S308, it is determined whether the door lock is set or released. If the door lock is released, control proceeds to a step S309 where a locking processing is carried out to set the door lock by operation of the solenoid plunger built in the door 7. Then, at a step S310, an alarm flag is set to put the motor vehicle in the alerted state.

In such a way, the door lock mounted to the door 407 can be set by simple operation of the door operation switch 414 mounted to the door 407, which is made through a finger of the driver who is an owner of the portable equipment 401, for example. On the other hand, without the portable equipment 401, the door operation switch 414 cannot be operated, never carrying out a locking or unlocking processing.

Similar control is carried out in case that the owner of the motor vehicle 402 releases the door lock of the door 407 when returning to a parking position. That is, subsequent to the step S306 for a proper code coincidence processing, it is determined at the step S308 that the door lock is set, so that control proceeds to a step S311 where a unlocking processing is carried out. Then, at a step S312, an alarm flag is reset to release the door lock, also resetting the alerted state of the motor vehicle 402.

Figure 23:
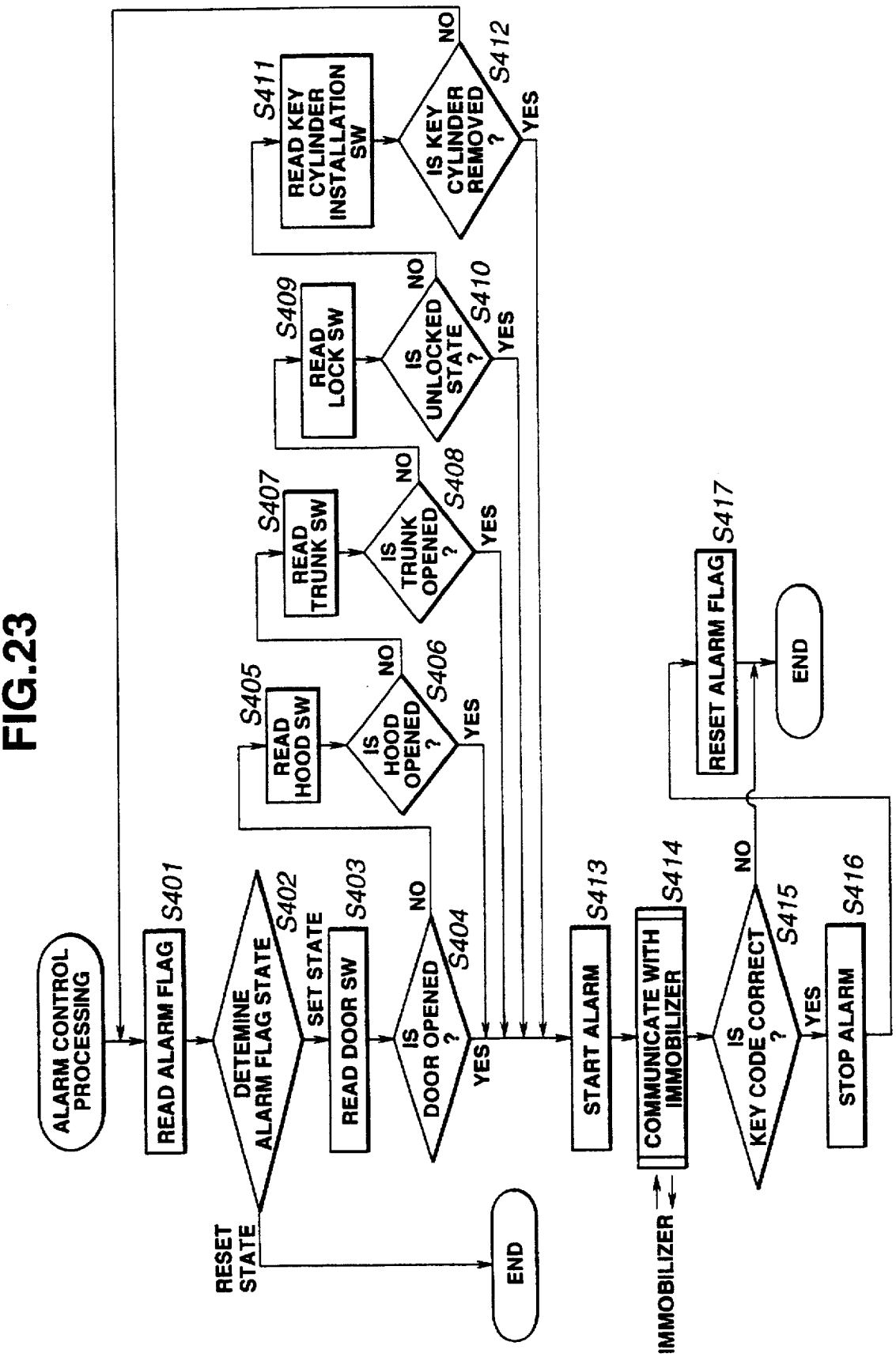
FIG. 23 is a view similar to FIG. 22, showing an alarm control processing of the locking/unlocking and alarm control unit.

Referring to FIG. 23, an alarm control processing of the locking/unlocking and alarm control unit 404 will be described in detail.

According to this alarm control processing, at a step S401, the state of the alarm flag is read at all times, which is controlled at the steps S310 and S312 in the flowchart in FIG. 22. When the alarm flag is set, the motor vehicle 402 is controlled in the alerted state, whereas when the alarm flag is reset, the motor vehicle 402 is controlled in the unalerted state.

That is, at a step S402, it is determined that the alarm flag is reset, control comes to an end, carrying out no alarm action even with anomaly of mounting, etc. of the hood, 405, door 407, trunk 409, and key cylinder of the motor vehicle 402.

On the other hand, after reading the alarm flag at the step S401, if it is determined at the step S402 that the alarm flag is set, an alert processing is carried out thereafter for provision against a car theft. Specifically, in the alerted state, the following control is repeatedly carried out: read of the state of the door switches 408 for detecting the open and closed state of the doors 407 at a step S403, read of the state of the hood switch 406 for detecting the open and closed state of the hood 405 at a step S405, read of the state of the trunk switch 410 for detecting the open and closed state of the trunk 409 at a step S407, read of the state of the lock switch, not shown, for detecting the locked and unlocked state of the door lock at a step S409, read of the state of the key cylinder tamper switches (key cylinder installation switches) 411 for detecting the installed state of the key cylinders built in the doors 407 at a step S411.

In that state, when detecting any of opening of the door 407 at a step S404, opening of the hood 405 at a step S406, opening of the trunk 409 at a step S408, unlocking of the door lock at a step S410, and removal of the key cylinder at a step S412, the alarm actions are started immediately at a step S413.

As described above, with the alarm actions, the warning horn 413 is driven discontinuously to produce an alarm sound of considerable volume to those who are around the motor vehicle 402. At the same time, the headlamps 412 are repeatedly turned on and off to produce a visual alarm indication to those who are around the motor vehicle 402. Thus, the auditory and visual alarm actions enable those who are around the motor vehicle 402 to warn an occurrence of some anomaly thereof. Such alarm actions are continued by a timer during a sufficient period of time to allow those who are around the motor vehicle 402 to sense an occurrence of some anomaly thereof. That is, without a subsequent alarm stop processing, the alarm actions are continuously carried out during a considerable period of time regardless of a participant in opening of the door 407, etc. who may be a legal driver or a thief.

Thus, in the fifth embodiment, control of steps S414–S417 is newly added for the driver who lost the portable equipment 401. Specifically, subsequently to start of the alarm actions at the step S413, at the step S414, a communication processing is carried out between the locking/unlocking and alarm control unit 404 and the immobilizer unit 417 to receive a collation result of a proper code as will be described later.

At the step S415, it is determined whether or not a proper code read from the chip 415a of the mechanical key 415 coincides with that of the motor vehicle 402. If the two coincide, i.e. a key code is correct, an alarm stop processing at the step S416, and an alarm flag reset processing at the step S417 are carried out immediately, obtaining stop of the alarm actions, and immediate releasing of the alerted state of the motor vehicle 402. On the other hand, at the step S415, the proper code read from the key cylinder 416 does not coincide with that of the motor vehicle 402, or the proper code itself does not exist, the above alarm stop processing at the step S416 and alarm flag reset processing at the step S417 are skipped, resulting in continuation of the alarm actions during a predetermined period of time set by the timer.

Figure 24:
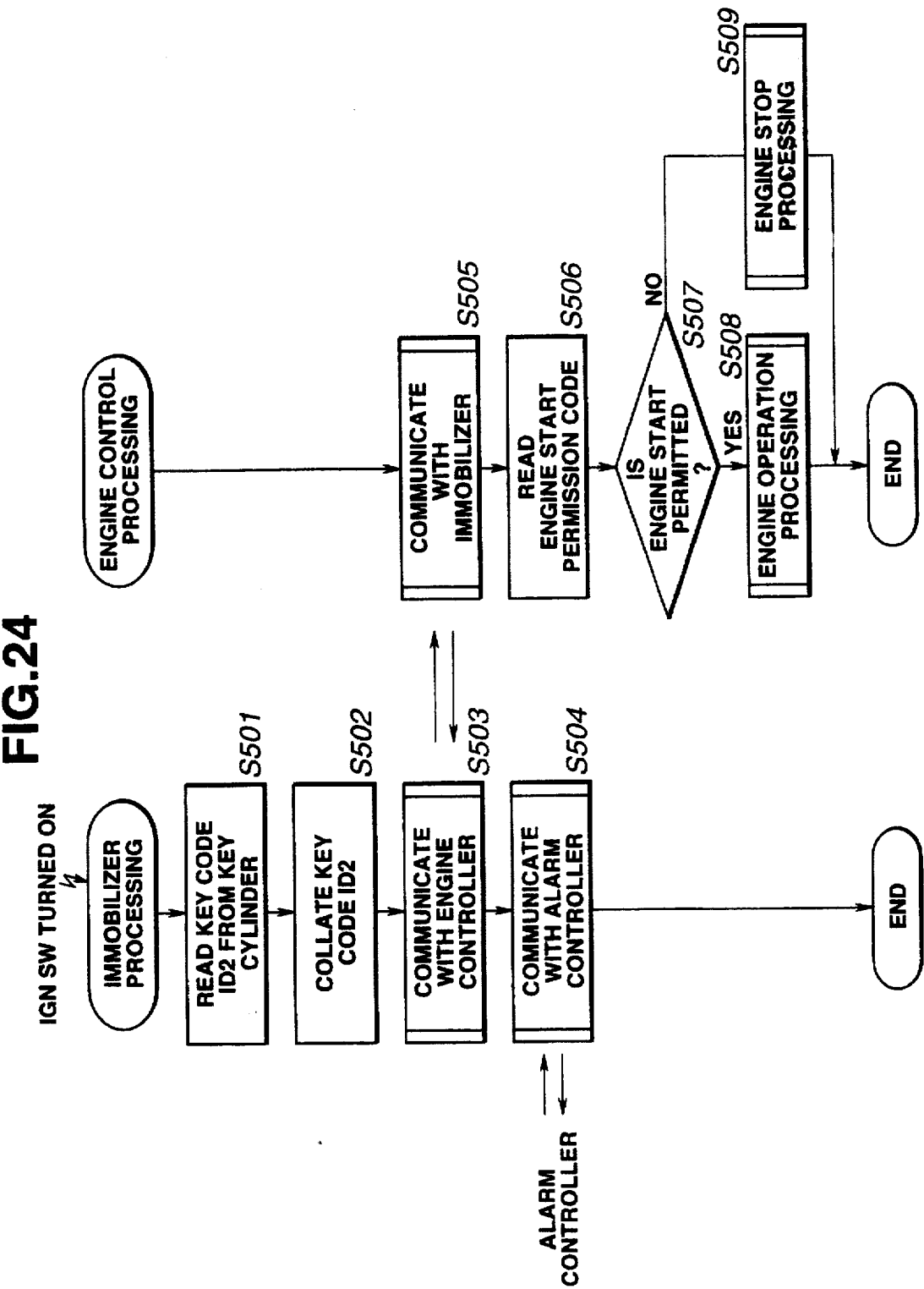
FIG. 24 is a view similar to FIG. 23, showing an engine start processing.

Referring to FIG. 24, a detailed description will be made with regard to operation of the immobilizer unit 417 related to an alarm stop processing at the step S416 and an alarm flag reset processing at the step S417 which feature the present invention.

In the immobilizer unit 417, at a step S501, as soon as an ignition switch is turned on with the key cylinder 416, a proper code ID2 is read from the key cylinder 416. That is, as described above, the chip 415a having a proper code stored therein is built in the mechanical key 415 applied in the fifth embodiment. When the mechanical key 415 is inserted into the key cylinder 416, and that a key switch constituting the key cylinder is turned to an ignition position, the immobilizer unit 417 is actuated to read the proper code ID2 from the mechanical key 415.

At a subsequent step S502, the proper code ID2 or key code as read is collated with that of the motor vehicle 402. The most common technique of a car theft is a forgery of the mechanical key 415 by copying only the shape thereof, and a destruction of the key cylinder 416 through the door 407 opened by breaking a window glass thereof, the engine being started by directly connecting contacts of the switch built in the key cylinder 416. In case of a car theft employing such technique, due to nonexistence of the proper code ID2, it is determined at the step S502 that a result of a collation processing of the proper code or key code ID2 is negative.

At a subsequent step S503, serial communication is carried out between the immobilizer unit 417 and the engine control unit 418.

On the other hand, in the engine control unit 418, at a step S505, communication is carried out with the immobilizer unit 417 to receive a collation result of the key code ID2. At a subsequent step S506, this collation result is recognized as an engine start permission code.

Then, at a step S507, in accordance with the collation result of the key code ID2, it is determined whether or not engine start is permitted. That is, instead of determining that engine start is permitted only when the proper code ID2 read from the mechanical key 415 coincides with that of the motor vehicle 402, it is determined that engine start is unpermitted when the two do not coincide.

At the step S507, if it is determined that engine start is permitted, control proceeds to a step S508 where a normal engine operation processing is carried out wherein a normal engine control operation is carried out in accordance with various signals read from the engine sensor group 419 to output signals to the engine actuator group 420 comprising an injector, ensuring normal subsequent operation of the engine. On the other hand, at the step S507, if it is determined that engine start is unpermitted, control proceeds to a step S509 where an engine stop processing is carried out to stop signals to the engine actuator group 420 immediately, thus stopping the engine.

In such a way, the immobilizer unit 417 is connected to the engine control unit 418 through a communication line, and it permits normal operation of the engine control unit 418 only when coincidence of the proper codes is confirmed. From this point of view, it can be considered that the immobilizer unit 417 serves to restrain engine start.

On the other hand, in the immobilizer unit 417, upon completion of the above engine start restraint processing, at a step S504, communication is carried out with the locking/unlocking and alarm control unit 404 to transmit thereto the collation result of the key code ID2 obtained at the step S502.

Returning to FIG. 23, in the locking/unlocking and alarm control unit 404, as described above, after execution of an alarm start processing at the step S413, communication is carried out with the immobilizer unit 417 at the step S414 to receive the collation result of the key code ID2.

Then, as described above, at the step S415, if it is determined that the key code ID2 is not correct, an alarm stop processing at the step S416 and an alarm flag reset processing at the step S417 are skipped. On the other hand, if it is determined that key code ID2 is correct, an alarm stop processing and an alarm flag reset processing are executed immediately to stop the alarm actions, releasing the alerted state of the motor vehicle 402.

In such a way, according to the fifth embodiment, referring to FIG. 22, a locking or unlocking processing (step S309 or S311) and an alarm flag set or reset processing (step S310 or S312) are generally carried out through radiocommunication between the portable equipment 401 and the locking/unlocking and alarm control unit 404.

Moreover, when the alarm flag is set, i.e. the motor vehicle 402 is in the alerted state, referring to FIG. 23, in response to opening of the door 407, hood 405, and trunk 409, unlocking of the door lock, and removal of the key cylinder, discontinuous sounding of the warning horn 413 and turn-on/turn-off of the headlamps 412 are continuously carried out during a predetermined period of time.

Such alarm actions are ensured even when the owner of the motor vehicle 402 who lost the portable equipment 401 releases the door lock with the formal mechanical key 415. As a result, a car theft employing a forgery of the mechanical key 415 by copying only the shape thereof can surely be prevented.

On the other hand, when the owner of the motor vehicle 402 releases the door lock with the formal mechanical key 415, then, inserts it into the key cylinder 416 to turn the ignition switch to the ignition position, the immobilizer unit 417 reads the propel code ID2 which is collated with that of the motor vehicle 402 as shown in FIG. 24. Only when the two coincide, the engine control unit 418 is actuated normally, starting operation of the engine. Moreover, only when coincidence of the proper code ID2 is confirmed in such a way, the locking/unlocking and alarm control unit 404 carries out an alarm stop processing as shown in FIG. 23 to stop immediately the alarm actions of turn-on/turn-off of the headlamps 412 and discontinuous sounding of the warning horn 413.

As a result, when the owner of the motor vehicle 402 who lost the portable equipment 401 releases the door lock of the door 407 with the formal mechanical key 415, then, inserts it into the key cylinder 416 to start the engine, the alarm actions can be stopped immediately, releasing the alerted state of the motor vehicle 402. That is, even when the door 407 is opened with the formal engine start key, the alarm actions are carried out. However, the alarm actions can be stopped as soon as engine start operation is carried out by inserting the mechanical key 415 into the key cylinder 416 for start the engine. Thus, as long as the driver is an owner of the motor vehicle 402, and has the formal engine start key, inconveniences can be avoided such as sounding of the warning horn 413 and turn-on/turn-off of the headlamps 412 during a long period of time. On the other hand, when engine start is tried by unfair means such as a shape forgery of the formal mechanical key 415, and a destruction of the key cylinder 416 through the door 407 opened by breaking a window glass thereof, not only engine start is impossible, but the alarm actions cannot be stopped. It will be thus understood that a car theft employing such unfair technique can surely be prevented in avoiding inconveniences such as sounding of the warning horn 413 and turn-on/turn-off of the headlamps 412 during a long period of time when a participant is an owner of the motor vehicle 402 who lost the portable equipment 401.

Having described the present invention in connection with the preferred embodiments, it is noted that the present invention is not limited thereto, and various modifications and changes can be made without departing the spirit of the present invention.

By way of example, collation of the ID number is carried out by transmitting/receiving radio waves between the key and the vehicular antenna. Alternatively, collation of the ID number may be carried out by detecting a quantity of light passing through the key, or a quantity of current by electromagnetic coupling.

Further, the ID number of the key is read out through radiocommunication. Alternatively, wire communication is applicable to read-out of the ID number wherein a circuit of the key is connected to a read-out circuit of the ignition key cylinder through a contact when inserting the key into the ignition key cylinder. Moreover, optical and magnetic communication systems are applicable to read-out of the ID number.

Furthermore, the present invention is applied to a motor vehicle having an engine as a power source, alternatively, it is applicable to a motor vehicle having a power source other than the engine such as an electric vehicle. In that case, it is recommended to provide a start prohibition command to a control unit of the starter motor when the registered key is not inserted into the ignition key cylinder, or that start operation is carried out repeatedly by a key other than the formal key.

Further, the key cylinder serves as a means for reading the proper code of the mechanical key. Alternatively, a code reader for special purpose may be used. Moreover, the immobilizer unit is not indispensable when considering only stop of the warning horn with respect to a normal action made by the owner of the motor vehicle.

Still further, the proper code used in locking/unlocking control of the door is different from that one used in the immobilizer unit, alternatively, the two may be the same code. It is preferable, however, to use two different codes in view of prevention of a car theft.

Furthermore, locking/unlocking control and alarm control are carried out by the locking/unlocking and alarm control unit, alternatively, they may be ensured by two different units.

What is claimed is:

1. An anti-theft protection system for a motor vehicle having an engine and a key with a transponder comprising:
   means for receiving a code of the key transmitted from the transponder;
   means for controlling the engine; and
   means for transmitting an engine start permission signal to said engine controlling means when said code as received coincides with code a as registered;
   said engine controlling means including:
      means for detecting an anomaly of one of said code receiving means, said engine controlling means and said signal transmitting means; and
      means for allowing start of the engine without receiving said engine start permission signal if said anomaly is detected.

2. An anti-theft protection system as claimed in claim 1, wherein
   said start allowing means are operative when said engine start permission signal is received and that a subsequent anomaly of said one is detected.

3. An anti-theft protection system as claimed in claim 2, wherein said start allowing means are operative when said engine start permission signal is received and that a new engine start permission signal fails to be received.

4. An anti-theft protection system as claimed in claim 3, wherein said start allowing means comprise:

means for setting a flag if said engine start permission signal is received when the key is operated to an ignition turn-on position
said start allowing means being operative when said engine start permission signal fails to be received while said flag is set.

5. An anti-theft protection system as claimed in claim 4, wherein said start allowing means comprise:
   means for resetting said flag if said anomaly fails to be detected when the key is operated to an ignition turn-off position,
   said start allowing means being operative only when said new engine start permission signal is received while said flag is reset.

6. An anti-theft protection system as claimed in claim 5, wherein said flag is stored in a nonvolatile memory.

7. An anti-theft protection system as claimed in claim 1, wherein said signal transmitting means comprise:
   means for determining whether said code as received coincides with said code as registered when the key is operated to an ignition turn-on position.

8. An anti-theft protection system as claimed in claim 1, wherein said anomaly detecting means detect said anomaly when a code transmitted from said engine controlling means to said signal transmitting means fails to coincide with a code returned from said signal transmitting means to controlling means.

9. An anti-theft protection system as claimed in claim 8, wherein said engine controlling means transmit to said signal transmitting means a new code corresponding to said engine start permission signal when the key is operated to said ignition turn-off position.
   said signal transmitting means returning said new code to said engine controlling means,
   said anomaly detecting means determining whether said new code transmitted from said engine controlling means to said signal transmitting means coincides with a new code returned from said signal transmitting means to said engine controlling means,
   said anomaly detecting means detecting said anomaly when said new code transmitted from said engine controlling means to said signal transmitting means fails to coincide with said new code returned from said signal transmitting means to said engine controlling means.

10. An anti-theft protection system as claimed in claim 1, wherein said engine controlling means comprise:
    means for determining whether a speed of the motor vehicle is greater than a predetermined speed;
    means for determining whether a start operation of the engine is made by a key over a predetermined number, and
    means for prohibiting start of the engine during a predetermined period of time, said start prohibiting means being operative when said speed is greater than said predetermined speed and that said start operation is carried out over said predetermined number.

11. An anti-theft protection system as claimed in claim 10, wherein said engine controlling means comprise:
    means for stopping a collation of said code as received with said code as registered during said predetermined period of time, said collation stopping means being operative when said speed is greater than said predetermined speed and that said start operation is carried out over said predetermined number.

12. An anti-theft protection system as claimed in claim 11, wherein said engine controlling means comprise:
   means for determining whether a noncoincidence of said code as received with said code as registered occurs over a predetermined number,
   said collation stopping means being operative when said noncoincidence occurs over said predetermined number,
   said start prohibiting means being operative when said noncoincidence occurs over said predetermined number.

13. An anti-theft protection system as claimed in claim 12, wherein said engine controlling means comprise:
   means for resetting a count number of start operation of the engine and that of noncoincidence of said code to zero, and reopening said collation of said code after a lapse of said predetermined period of time.

14. An anti-theft protection system as claimed in claim 10, wherein said speed determining means include a speed detector.

15. An anti-theft protection system as claimed in claim 10, wherein said start operation determining means include a switch.

16. An anti-theft protection system as claimed in claim 1, wherein said engine controlling means comprise:
   means for storing and engine start permission signal in a nonvolatile way.

17. An anti-theft protection system as claimed in claim 16, wherein said engine controlling means comprise:
   means for detecting a stop operation of the engine made by the key; and
   means for erasing said engine start permission signal as stored, said engine start permission signal erasing means being operative when said stop operation is detected.

18. An anti-theft protection system as claimed in claim 17, further comprising:
   a connector arranged to connect a battery and said engine controlling means; and
   means for detecting whether said connector ensures a connection between said battery and said engine controlling means.

19. An anti-theft protection system as claimed in claim 18, wherein said connector detecting means include terminals and a microcomputer.

20. An anti-theft protection system as claimed in claim 18, wherein said engine controlling means comprise:
   means for storing a disconnection flag when said connector fails to ensure said connection,
   said engine start permission signal erasing means being operative when said connector ensures said connection and that said disconnection flag is stored.

21. An anti-theft protection system as claimed in claim 1, further comprising:
   means for putting the motor vehicle of one of a locked and alerted state and an unlocked and unalerted state at least on condition that said code as received coincides with said code as registered;
   means for ensuring, in said locked and alerted state, a predetermined alarm action even when the motor vehicle is unlocked with the key; and
   means for stopping said predetermined alarm action when said code as received coincides with said code as registered.

22. An anti-theft protection system as claimed in claim 21, wherein said predetermined alarm action ensuring means ensuring said predetermined alarm action when detecting one of opening of a door, a trunk and a hood, releasing of a lock, and removal of said key cylinder.

23. An anti-theft protection system as claimed in claim 21, wherein said predetermined alarm action includes a visual alarm.

24. An anti-theft protection system as claimed in claim 23, wherein said predetermined alarm action includes an auditory alarm.

25. An anti-theft protection system as claimed in claim 1, wherein said signal transmitting means include a key cylinder.

26. An anti-theft protection system as claimed in claim 1, wherein said code receiving means include a transmitter-receiver.

27. An anti-theft protection system as claimed in claim 1, wherein said signal transmitting means include an immobilizer unit.

28. A method of protecting a motor vehicle from a theft, the motor vehicle having an engine, a key with a transponder, a transmitter-receiver, an engine control unit and an immobilizer unit, the method comprising the steps of:
   receiving a code of the key transmitted from the transponder;
   transmitting an engine start permission signal to the engine control unit when said code as received coincides with a code as registered;
   detecting an anomaly of one of the transmitter-receiver, the engine control unit and the immobilizer unit; and
   allowing start of the engine without receiving said engine start permission signal if said anomaly is detected.

29. A method as claimed in claim 28,
   wherein said start allowing step is carried out when said engine start permission signal is received and that a subsequent anomaly of said one is detected.

30. A method as claimed in claim 29, wherein said start allowing step is carried out when said engine start permission signal is received and that a new engine start permission signal fails to be received.

31. A method as claimed in claim 29, wherein said anomaly detecting step is carried out to detect said anomaly when a code transmitted from the engine control unit to the immobilizer unit fails to coincide with a code returned from the immobilizer unit to the engine control unit.

32. A method as claimed in claim 31, further comprising the steps of:
   transmitting from the engine control unit to the immobilizer unit a new code corresponding to said engine start permission signal when the key is operated to said ignition turn-off position;
   returning said new code from the immobilizer unit to the engine control unit;
   determining whether said new code transmitted from the engine control unit to the immobilizer unit coincides with a new code returned from the immobilizer unit to the engine control unit; and
   detecting said anomaly when said new code transmitted from the engine control unit to the immobilizer unit fails to coincide with said new code returned from the immobilizer unit to the engine control unit.

33. A method as claimed in claim 28, further comprising the step of:
   determining whether said code as received coincides with said code as registered when the key is operated to an ignition turn-on position.

34. A method as claimed in claim 33, further comprising the step of:

setting a flag if said engine start permission signal is received when the key is operated to said ignition turn-on position, said start allowing step being carried out when said engine start permission signal fails to be received while said flag is set.

35. A method as claimed in claim 34, further comprising the step of:

resetting said flag if said anomaly fails to be detected when the key is operated to an ignition turn-off position, said start allowing step being carried out only when said new engine start permission signal is received while said flag is reset.

36. A method as claimed in claim 35, wherein said flag is stored in a nonvolatile memory.

37. A method as claimed in claim 28, further comprising the steps of:

determining whether a speed of the motor vehicle is greater than a predetermined speed;

determining whether a start operation of the engine is made by the key over a predetermined number; and prohibiting start of the engine during a predetermined period of time, said start prohibiting step being carried out when said speed is greater than said predetermined speed and that said start operation is carried out over said predetermined number.

38. A method as claimed in claim 37, further comprising the steps of:

stopping a collation of said code as received with said code as registered during said predetermined period of time, said collation stopping step being carried out when said speed is greater than said predetermined speed and that said start operation is carried out over said predetermined number.

39. A method as claimed in claim 38, further comprising the step of:

determining whether a noncoincidence of said code as received with said code as registered occurs over a predetermined number, said collation stopping step being carried out when said noncoincidence occurs over said predetermined number.

40. A method as claimed in claim 39, further comprising the steps of:

resetting a count number of start operation of the engine and that of noncoincidence of said code to zero; and reopening said collation of said code after a lapse of said predetermined period of time.

41. A method as claimed in claim 37, wherein said speed determining step is carried out with a speed detector.

42. A method as claimed in claim 37, wherein said start operation determining step is carried out with a switch.

43. A method as claimed in claim 28, further comprising the step of:

storing said engine start permission signal in a nonvolatile way.

44. A method as claimed in claim 43, further comprising the steps of:

detecting a stop operation of the engine made by the key; and erasing said engine start permission signal as stored, said engine start permission signal erasing step being carried out when said stop operation is detected.

45. A method as claimed in claim 44, further comprising the steps of:

detecting whether a connector ensures a connection between a battery and the engine control unit; and storing a disconnection flag when said connector fails to ensures said connection, said engine start permission signal erasing step being carried out when said connector ensures said connection and that said disconnection flag is stored.

46. A method as claimed in claim 45, wherein said connector detecting step is carried out with terminals and a microcomputer.

47. A method as claimed in claim 28, further comprising the steps of:

putting the motor vehicle in one of a locked and alerted state and an unlocked and unalerted state at least on condition that said code as received coincides with said code as registered;

ensuring, in said locked and alerted state, a predetermined alarm action even when the motor vehicle is unlocked with the key; and stopping said predetermined alarm action when said code as received coincides with said code as registered.

48. A method as claimed in claim 47, wherein said predetermined alarm action ensuring step is carried out when detecting one of opening of a door, a trunk and a hood, releasing of a lock, and removal of a key cylinder.

49. A method as claimed in claim 48, wherein said predetermined alarm action includes a visual alarm.

50. A method as claimed in claim 49, wherein said predetermined alarm action includes an auditory alarm.

* * * * *